United States Patent
Hashimoto et al.

(10) Patent No.: US 11,469,652 B2
(45) Date of Patent: Oct. 11, 2022

(54) METHOD OF MANUFACTURING STACKED CORE AND APPARATUS FOR MANUFACTURING STACKED CORE

(71) Applicant: Mitsui High-tec, Inc., Kitakyushu (JP)

(72) Inventors: Akihiro Hashimoto, Kitakyushu (JP); Daisuke Komiya, Kitakyushu (JP)

(*) Notice: Subject to any disclaimer, the term of this patent is extended or adjusted under 35 U.S.C. 154(b) by 170 days.

(21) Appl. No.: 16/519,011

(22) Filed: Jul. 23, 2019

(65) Prior Publication Data
US 2019/0372439 A1 Dec. 5, 2019

Related U.S. Application Data

(63) Continuation of application No. PCT/JP2017/040278, filed on Nov. 8, 2017.

(30) Foreign Application Priority Data

Jan. 25, 2017 (JP) .............................. JP2017-011381

(51) Int. Cl.
| | | |
|---|---|---|
| *H02K 15/02* | (2006.01) | |
| *B21D 39/00* | (2006.01) | |
| *H02K 1/16* | (2006.01) | |
| *H02K 1/26* | (2006.01) | |

(52) U.S. Cl.
CPC ........... *H02K 15/024* (2013.01); *B21D 39/00* (2013.01); *H02K 1/16* (2013.01); *H02K 1/26* (2013.01)

(58) Field of Classification Search
CPC .......... H02K 15/024; H02K 1/16; H02K 1/26; B21D 39/00; B21D 28/02; B21D 28/24
See application file for complete search history.

(56) References Cited

U.S. PATENT DOCUMENTS

| | | | | |
|---|---|---|---|---|
| 9,511,405 B2* | 12/2016 | Oba | ........................ | B21D 28/02 |
| 9,511,406 B2* | 12/2016 | Oba | ........................ | B21D 28/06 |
| 2010/0043202 A1 | 2/2010 | Tosu | | |

(Continued)

FOREIGN PATENT DOCUMENTS

| | | |
|---|---|---|
| CN | 101542874 | 9/2009 |
| CN | 102111042 | 6/2011 |

(Continued)

OTHER PUBLICATIONS

International Search Report dated Feb. 6, 2018 for PCT/JP2017/040278.

(Continued)

*Primary Examiner* — Peter Dungba Vo
*Assistant Examiner* — Jose K Abraham
(74) *Attorney, Agent, or Firm* — Soei Patent & Law Firm

(57) ABSTRACT

A method of manufacturing a stacked core includes forming a first pilot hole in a metal plate, forming a worked portion of the metal plate in a state in which a first pilot pin is inserted into the first pilot hole, the worked portion being displaced relative to a plane of the metal plate, press-fitting the worked portion of the metal plate to reposition the worked portion to extend along the plane of the metal plate, forming a second pilot hole in the metal plate after press-fitting the worked portion of the metal plate, and forming a blanked member by blanking the metal plate in a state in which a second pilot pin is inserted into the second pilot hole, the blanked member including the worked portion.

20 Claims, 14 Drawing Sheets

(56) References Cited

U.S. PATENT DOCUMENTS

| | | | |
|---|---|---|---|
| 2010/0052463 A1* | 3/2010 | Saito | H02K 1/276 310/216.001 |
| 2010/0327690 A1 | 12/2010 | Umeda et al. | |
| 2011/0154650 A1 | 6/2011 | Hashimoto | |
| 2011/0232076 A1* | 9/2011 | Matsubara | B21D 28/06 29/564 |
| 2015/0325366 A1* | 11/2015 | Arima | H01F 41/0233 29/609 |
| 2016/0336840 A1 | 11/2016 | Hasuo et al. | |
| 2017/0005551 A1 | 1/2017 | Sasaki et al. | |
| 2017/0361369 A1 | 12/2017 | Horii et al. | |

FOREIGN PATENT DOCUMENTS

| | | | |
|---|---|---|---|
| CN | 102714449 | 10/2012 | |
| CN | 104242565 | 12/2014 | |
| CN | 105081057 | 11/2015 | |
| JP | S64-077437 | 3/1989 | |
| JP | 2001-190048 | 7/2001 | |
| JP | 2006-280017 | 10/2006 | |
| JP | 2011-139605 | 7/2011 | |
| JP | 2012-010425 | 1/2012 | |
| JP | 2015-080412 | 4/2015 | |
| JP | 2016-214000 | 12/2016 | |
| JP | 2016-226109 | 12/2016 | |
| JP | 2016226109 A * | 12/2016 | |
| JP | 2017-017855 | 1/2017 | |
| KR | 101672979 B1 * | 11/2016 | B21D 39/00 |
| WO | 2008/133090 | 11/2008 | |
| WO | 2016/098145 | 6/2016 | |
| WO | 2016/098354 | 6/2016 | |

OTHER PUBLICATIONS

International Preliminary Report on Patentability with Written Opinion dated Aug. 8, 2019 for PCT/JP2017/040278.

Extended Search Report in corresponding European Application No. 17894102.7, dated Oct. 26, 2020.

* cited by examiner

METHOD OF MANUFACTURING STACKED CORE AND APPARATUS FOR MANUFACTURING STACKED CORE

CROSS-REFERENCE TO RELATED APPLICATIONS

This application is a continuation application of PCT Application No. PCT/JP2017/040278 filed on Nov. 8, 2017, which claims the benefit of priority from Japanese Patent Application No. 2017-011381, filed on Jan. 25, 2017, the entire contents of which are incorporated herein by reference.

FIELD

The present disclosure relates to a method of manufacturing a stacked core and an apparatus for manufacturing a stacked core.

BACKGROUND

A stacked stator core is a part that constitutes a motor. A stacked stator core is obtained by stacking and fastening a plurality of metal plates (for example, electrical steel sheets) processed in a predetermined shape. A stacked stator core typically has a ring-shaped yoke portion and a plurality of tooth portions protruding from the inner edge of the yoke portion toward the center of the yoke portion. In order to produce a motor, a winding coil is wound around each tooth portion with a predetermined number of turns. However, since the distance between adjacent tooth portions is usually narrow, the operation of winding a winding coil around a tooth portion tends to be difficult.

Japanese Unexamined Patent Publication No. 2012-010425 discloses a method of manufacturing a stacked stator core, including a first step of intermittently feeding a coil material, which is a strip-like metal plate (workpiece plate) wound in a coil shape, from an uncoiler and blanking the metal plate by a punch to form a plurality of blanked members (see Paragraph 0022 and step A in FIG. 4). Additionally, the method includes a second step of stacking the plurality of blanked members to obtain a stack including a yoke portion and tooth portions protruding from the inner edge of the yoke portion toward the center of the yoke portion (see Paragraph 0028 and step B in FIG. 4). In a third step, the stack is divided into individual pieces for each tooth portion to form a plurality of core pieces (see Paragraph 0029 and step D in FIG. 4), and in a fourth step, a winding coil is wound around the tooth portion of each core piece (see Paragraph 0029 and step E in FIG. 4). Finally, in a fifth step of assembling the core pieces, the adjacent yoke portions are connected to each other to obtain a ring-shaped stacked core (see Paragraph 0029 and step F in FIG. 4).

A pilot hole is formed in the metal plate before the first step in order to position the metal plate by a pilot pin (retainer pin) in blanking the metal plate by a punch.

SUMMARY

An example method of manufacturing a stacked core may comprise forming a first pilot hole in a strip-like metal plate by a first punch, and processing a predetermined portion of the metal plate by a second punch, in a state in which a first pilot pin is inserted into the first pilot hole to position the metal plate. The method may further comprise press-fitting a worked portion of the metal plate that is processed by the second punch into the metal plate, in a state in which a first pilot pin is inserted into the first pilot hole to position the metal plate, and forming a second pilot hole in the metal plate by a third punch, after press-fitting the worked portion into the metal plate and before performing another process on the metal plate. Additionally, the method may comprise forming a blanked member by blanking a region including the worked portion by a fourth punch, in a state in which a second pilot pin is inserted into the second pilot hole to position the metal plate.

An example apparatus for manufacturing a stacked core may comprise a feeder configured to sequentially feed a strip-like metal plate intermittently, four punch apparatus, and first and second pilot pins. The apparatus may further comprise a driver configured to drive the first, second, third and fourth punch apparatus and the first and second pilot pins, and a controller. The controller may be configured to intermittently control the feeder to sequentially feed the metal plate, and to control the driver to form a first pilot hole in the metal plate by the first punch apparatus. Still further, the controller may be configured to control the driver to process a predetermined portion of the metal plate by the second punch apparatus, in a state in which the first pilot pin is inserted into the first pilot hole to position the metal plate, and to control the driver to form a second pilot hole in the metal plate by the third punch apparatus, after a worked portion of the metal plate that is processed by the second punch is press-fitted into the metal plate and before another work is performed on the metal plate. Additionally, the controller may be configured to control the driver to form a blanked member by blanking a region including the worked portion by the fourth punch apparatus, in a state in which a second pilot pin is inserted into the second pilot hole to position the metal plate.

DETAILED DESCRIPTION

In the following description, with reference to the drawings, the same reference numbers are assigned to the same components or to similar components having the same function, and overlapping description is omitted.

Structure of Stacked Stator Core

Figure 1:
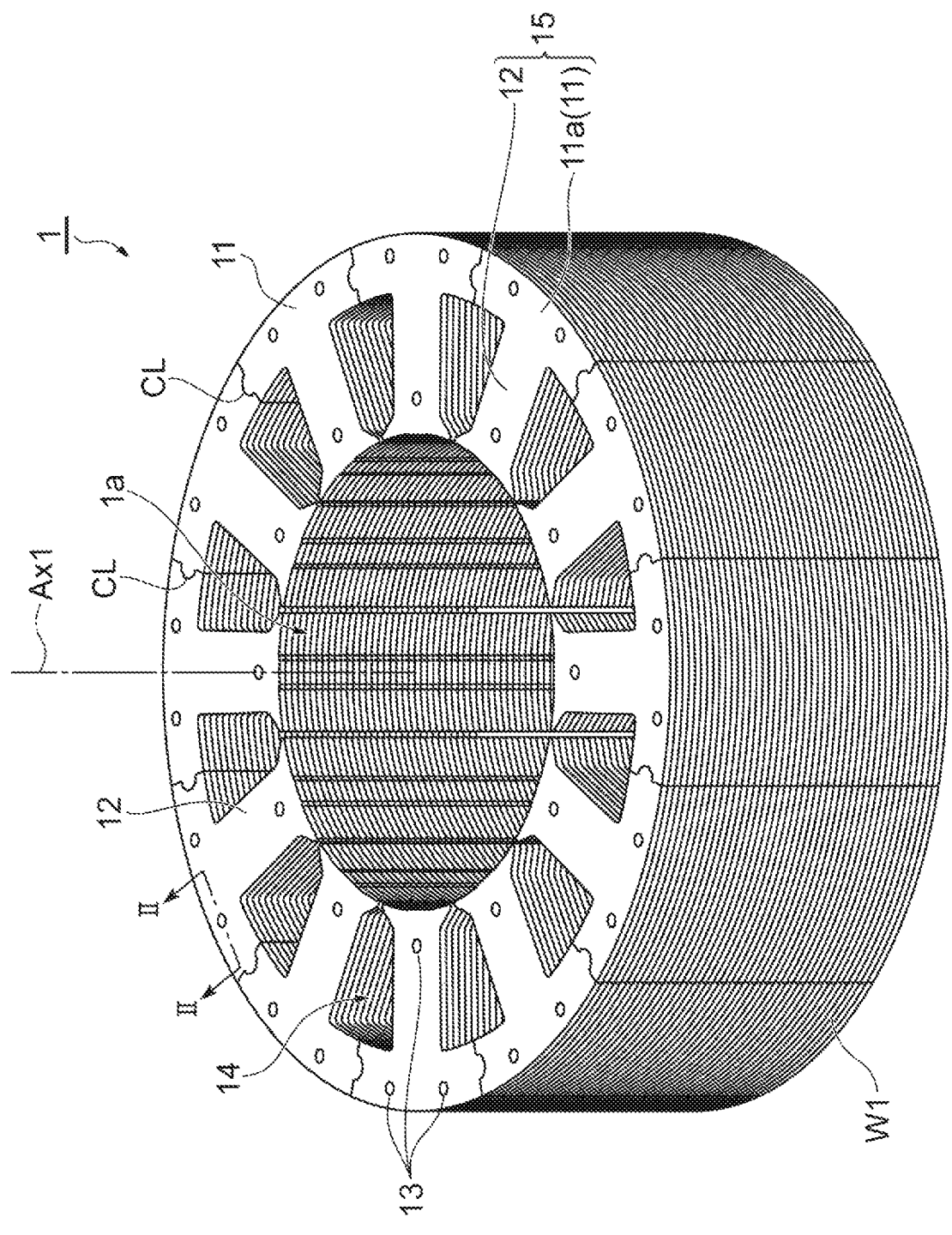
FIG. 1 is a perspective view illustrating an example stacked stator core.
Figure 2:
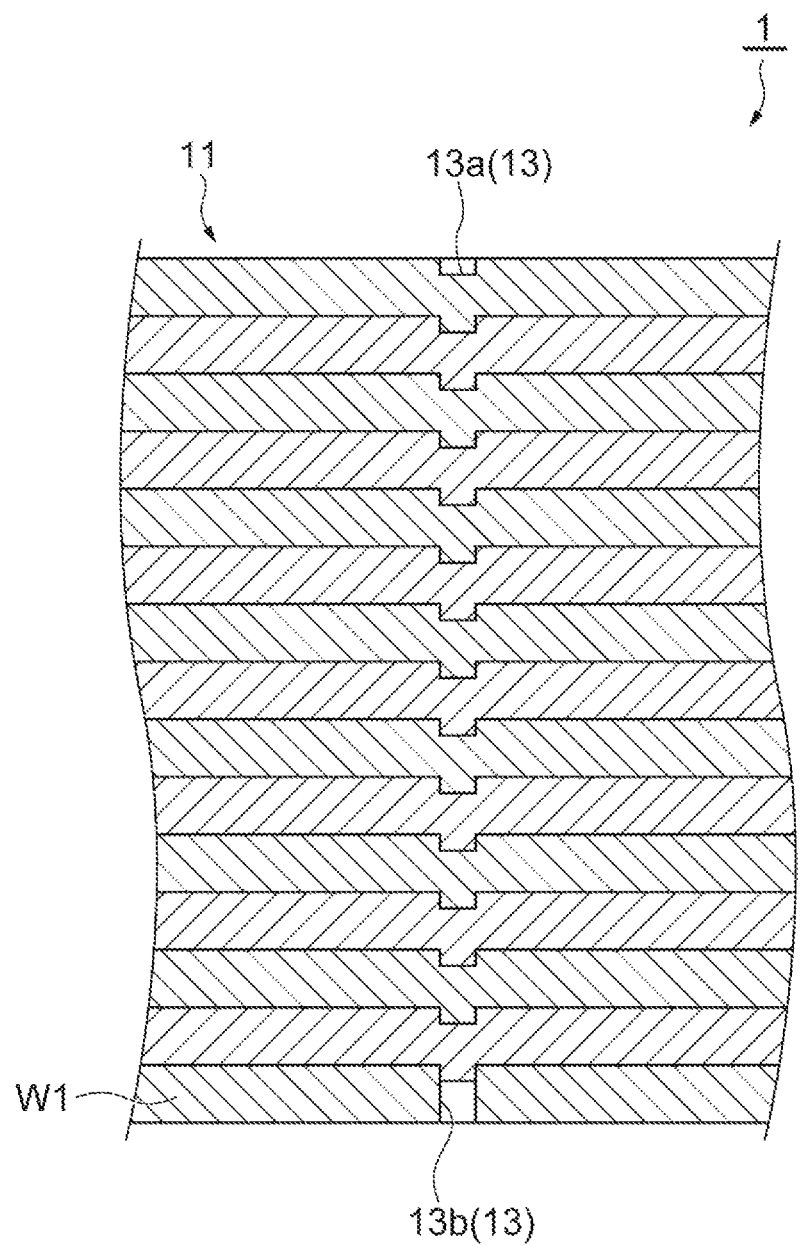
FIG. 2 is a sectional view along line II-II in FIG. 1.

Referring to FIG. 1 and FIG. 2, a configuration of an example stacked stator core 1 is described. A stacked stator core 1 is a part of a stator. The stator has windings attached to the stacked stator core 1. The stator is combined with a rotor to form a motor. As illustrated in FIG. 1, the stacked stator core 1 has a cylindrical shape. In some examples, a through hole 1a (center hole) extending along a center axis Ax1 is provided in the center part of the stacked stator core 1. A rotor can be disposed in the through hole 1a.

The stacked stator core 1 may include a plurality of blanked members W1 (first blanked members) which are stacked together. The blanked members W1 each include a plate-shaped part formed by blanking an electrical steel sheet ES (metal plate) into a predetermined shape (described in further detail below). The stacked stator core 1 may be formed by rotational stacking. "Rotational stacking" refers to stacking the blanked members W1 while shifting or rotating the relative angles between the blanked members W1. The rotational stacking is performed mainly for cancelling, accommodating, or adjusting for the plate thickness deviations of the stacked stator core 1. The angle of rotational stacking may be set to a predetermined value.

The stacked stator core 1 has a yoke portion 11, a plurality of tooth portions 12, and a plurality of connecting tab portions 13. The yoke portion 11 has an annular shape and extends so as to surround the center axis Ax1. The width in the radial direction, the inner diameter, the outer diameter, and the thickness of the yoke portion 11 can each be set to a variety of values according to the purpose and performance of the motor.

Each tooth portion 12 extends along the radial direction of the yoke portion 11 from the inner edge of the yoke portion 11 toward the center axis Ax1. For example, each tooth portion 12 protrudes from the inner edge of the yoke portion 11 toward the center axis Ax1. In the stacked stator core 1, twelve tooth portions 12 are formed integrally with the yoke portion 11. The tooth portions 12 are arranged at substantially regular intervals in the circumferential direction of the yoke portion 11. A slot 14 or a space for disposing a winding may be located between adjacent tooth portions 12.

The connecting tab portions 13 are provided at the yoke portion 11 and the tooth portions 12. In some examples, the blanked members W1 adjacent to each other in the stacking direction are fastened to each other by the connecting tab portions 13. As illustrated in FIG. 2, the connecting tab portions 13 may include a connecting tab 13a foamed at a blanked member W1 forming a layer other than the bottom layer of the stacked stator core 1 and a through hole 13b formed at a blanked member W1 forming the bottom layer of the stacked stator core 1. The connecting tab 13a is configured with a depression formed on the front surface side of the blanked member W1 and a projection formed on the back surface side of the blanked member W1. The depression of the connecting tab 13a of one blanked member W1 is joined to the projection of the connecting tab 13a of another blanked member W1 adjacent to the front surface side of the one blanked member W1. The projection of the connecting tab 13a of one blanked member W1 is joined to the depression of the connecting tab 13a of still another blanked member W1 adjacent to the back surface side of the one blanked member W1. The projection of the connecting tab 13a of the blanked member W1 adjacent to the bottom layer of the stacked stator core 1 is joined to the through hole 13b. The through hole 13b has a function of preventing the subsequently formed blanked member W1 from being fastened to the previously produced stacked stator core 1 by the connecting tab 13a when the stacked stator cores 1 are continuously produced.

The blanked members W1 may be fastened to each other by a variety of methods, instead of the connecting tab portions 13. For example, the blanked members W1 may be joined to each other using adhesive or a resin material or joined to each other by welding. Alternatively, the blanked member W1 may be provided with a temporarily-connecting tab, and the stacked stator core 1 may be obtained by fastening the blanked members W1 to each other through the temporarily-connecting tabs to form a stack, and thereafter removing the temporarily-connecting tabs from the stack. The "temporarily-connecting tab" may include a connecting tab used for temporarily integrating the blanked members W1 and removed in the process of producing a product (stacked stator core 1).

Figure 3:
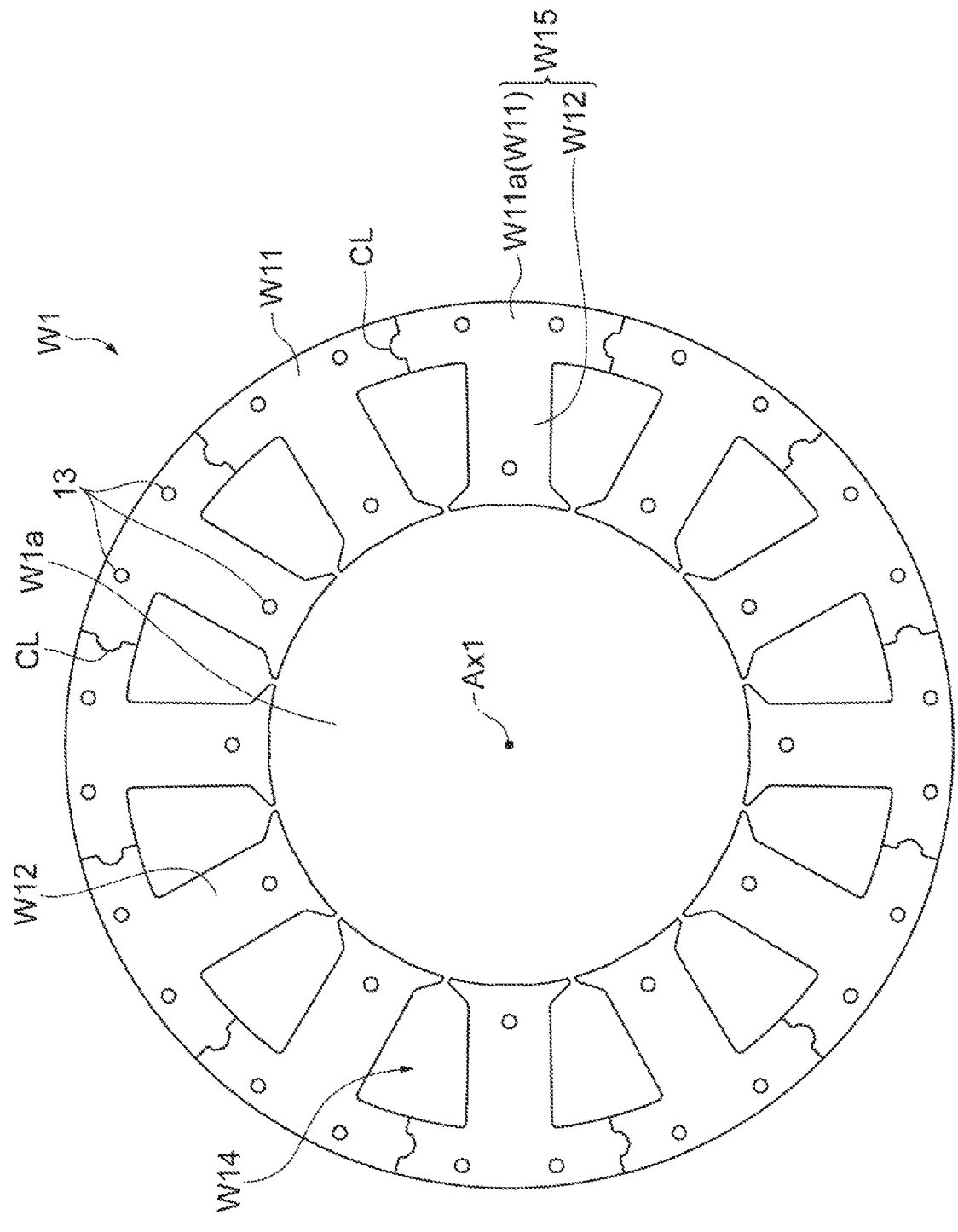
FIG. 3 is a top view illustrating an example blanked member that constitutes the stacked stator core in FIG. 1.

Referring now to FIG. 3, the blanked member W1 will be described in more detail. The shape of the blanked member W1 as viewed from the center axis Ax1 direction is substantially the same as the shape of the stacked stator core 1 as viewed from the center axis Ax1 direction. The blanked member W1 therefore also has an annular shape as viewed from the center axis Ax1 direction. A through hole W1a is provided at the center part of the blanked member W1.

The blanked member W1 has a yoke portion W11 and the tooth portions W12. The yoke portion W11 and the tooth portions W12 are provided with connecting tab portions 13. The yoke portion W11 has an annular shape and extends so as to surround the center axis Ax1. The yoke portion W11 has a plurality of cut lines CL. In the blanked member W1 illustrated in FIG. 2, the yoke portion W11 has twelve cut lines CL.

Each cut line CL extends along the radial direction of the yoke portion W11 so as to traverse the yoke portion W11. The cut lines CL are arranged at substantially regular intervals in the circumferential direction of the yoke portion W11. The cut lines CL may be formed, for example, by lancing or blanking an electrical steel sheet ES and thereafter pushing back the lanced portion or the blanked portion (the worked portion) and press-fitting it into the original position (the position to be worked) of the workpiece plate. When the electrical steel sheet ES is lanced or blanked, the worked portion is plastically deformed and slightly stretched. Thus, when the worked portion is press-fitted into the position to be worked or processed, the worked portion is firmly fitted in the electrical steel sheet ES to such an extent that is not easily disengaged manually.

The shape of the cut line CL is not limited to a projecting and depressed shape as illustrated in FIG. 1 and FIG. 2 and may include other shapes that traverse between the outer peripheral edge and the inner peripheral edge of the yoke portion W11, such as a linear shape, a curved shape, a crank shape, a bow shape, and an arc shape. When the shape of the cut line CL is linear, the cut line CL may extend along the radial direction of the yoke portion W11 or may extend to be inclined at a predetermined angle relative to the radial direction of the yoke portion W11. When the shape of the cut line CL is linear, the yoke portion W11 may be readily divided into individual pieces at the cut lines CL, with a relatively small force.

Each tooth portion W12 extends along the radial direction of the yoke portion W11 from the inner edge of the yoke portion W11 toward the center axis Ax1. Each tooth portion W12 may protrude from the inner edge of the yoke portion W11 toward the center axis Ax1. In some examples, twelve tooth portions W12 are formed integrally with the yoke portion W11.

The tooth portions W12 are arranged at substantially regular intervals in the circumferential direction of the yoke portion W11. Each tooth portion W12 is positioned between adjacent cut lines CL in the circumferential direction of the yoke portion W11. A slot W14 that is a space for disposing a winding is located between adjacent tooth portions W12.

When the blanked member W1 is divided into individual pieces at the cut lines CL, a plurality of plate pieces W15 (in FIG. 2, twelve plate pieces W15) are obtained from one blanked member W1. In some examples, the blanked member W1 is an assembly in which the plate pieces W15 are combined. One plate piece W15 is configured with one yoke piece portion W11a and one tooth portion W12. The yoke piece portion W11a is a part of the yoke portion W11 when the yoke portion W11 is divided by the cut lines CL. The blanked member W1 is therefore integrated by temporarily connecting the plate pieces W15 adjacent in the circumferential direction of the center axis Ax1 at the ends of the yoke piece portions W11a (cut lines CL).

Returning to FIG. 1, the stacked stator core 1 is formed by stacking the blanked members W1 as described above. The blanked members W1 may be stacked such that the yoke portions W11, the tooth portions W12, and the cut lines CL overlap each other. Therefore, when a predetermined force is applied to the stacked stator core 1 to divide the stacked stator core 1 into individual pieces at the cut lines CL, a plurality of core pieces 15 (in FIG. 1, twelve core pieces 15) are obtained from the stacked stator core 1. In some examples, the stacked stator core 1 is also an assembly in which the core pieces 15 are combined. One core piece 15 is configured with one yoke piece portion 11a and one tooth portion 12. The yoke piece portion 11a is a part of the yoke portion 11 when the yoke portion 11 is divided by the cut lines CL. The stacked stator core 1 is therefore integrated by temporarily connecting the core pieces 15 adjacent in the circumferential direction of the center axis Ax1 at the ends of the yoke piece portions 12a (cut lines CL).

Structure of Stacked Rotor Core

Figure 4:
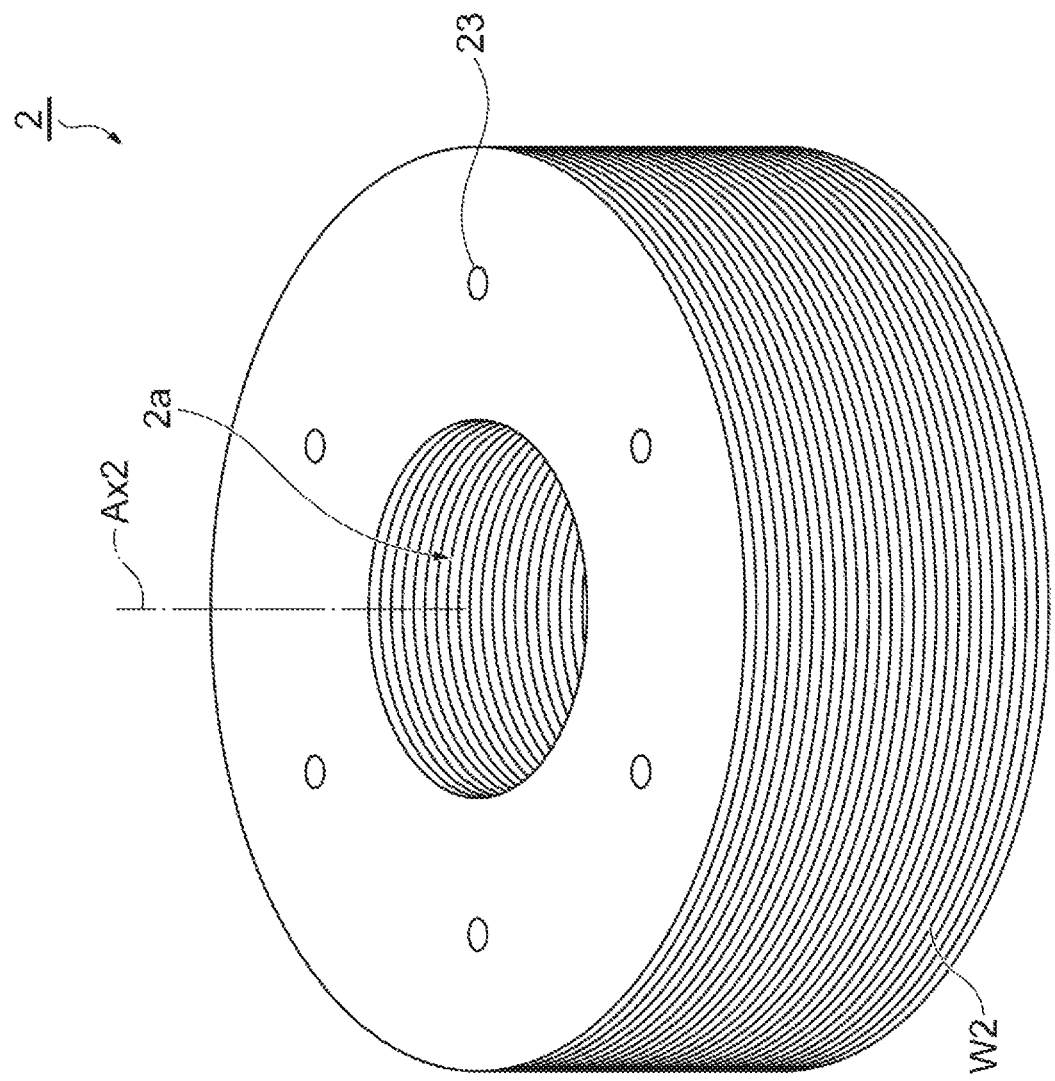
FIG. 4 is a perspective view illustrating an example stacked rotor core.

Referring now to FIG. 4, an example configuration of a stacked rotor core 2 is described. The stacked rotor core 2 is a part of a rotor. The rotor is formed by attaching end plates and a shaft to the stacked rotor core 2. The stacked rotor core 2 has a cylindrical shape. In some examples, a through hole 2a (center hole) extending along the center axis Ax1 is provided at the center part of the stacked rotor core 2. A shaft can be disposed in the through hole 2a.

The stacked rotor core 2 is a stack in which a plurality of blanked members W2 (second blanked members) are stacked. The blanked members W2 each are a plate-shaped part formed by blanking an electrical steel sheet ES (metal plate) into a predetermined shape. The stacked rotor core 2 may be formed by rotational stacking in substantially the same manner as the stacked stator core 1. The angle of rotational stacking may be set to a predetermined value.

The stacked rotor core 2 has a plurality of connecting tab portions 23. The connecting tab portions 23 include a connecting tab and a through hole and have a function of fastening the adjacent blanked members W2 to each other, in substantially the same manner as the connecting tab portions 13. The blanked members W2 may be fastened to each other by a variety of methods, instead of the connecting tab portions 23. For example, the blanked members W2 may be joined to each other using adhesive or a resin material or joined to each other by welding. Alternatively, the blanked member W2 may be provided with a temporarily-connecting tab, and the stacked rotor core 2 may be obtained by fastening the blanked members W2 to each other through the temporarily-connecting tabs to form a stack, and thereafter removing the temporarily-connecting tabs from the stack.

At least one magnet insertion hole extending along the center axis Ax1 (stacking direction) and passing through the stack 20 may be provided in the stacked rotor core 2. The magnet insertion hole may be filled with a resin material with a permanent magnet disposed therein. The resin material has a function of fixing a permanent magnet in the magnet insertion hole and a function of joining the blanked members W2 adjacent in the top-bottom direction to each other.

Apparatus for Manufacturing Stacked Core

Figure 5:
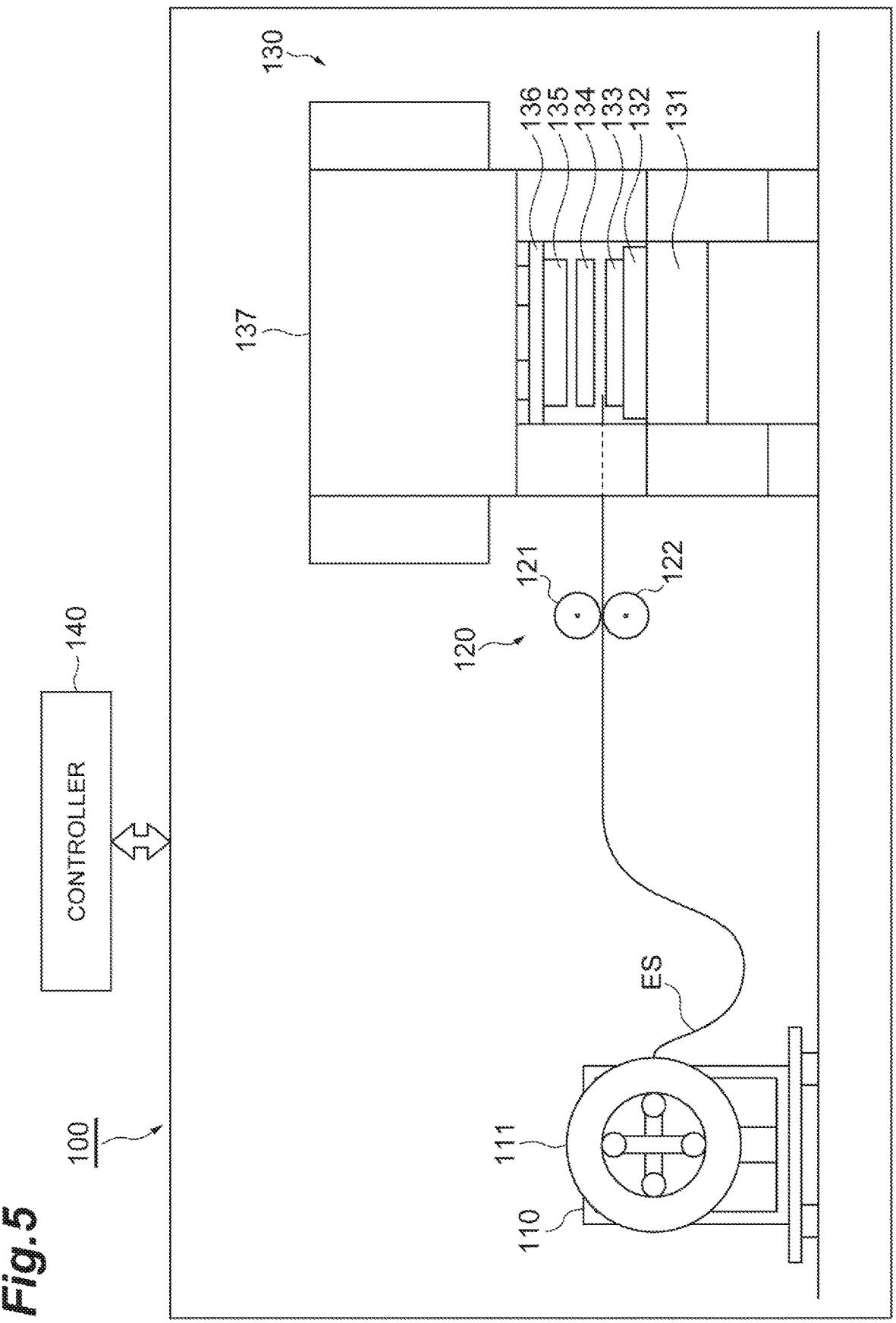
FIG. 5 is a schematic diagram illustrating an example apparatus for manufacturing a stacked stator core.

Referring now to FIG. 5, an example apparatus 100 for manufacturing the stacked stator core 1 and the stacked rotor core 2 is described.

The apparatus 100 is configured to manufacture the stacked stator core 1 and the stacked rotor core 2 from an electrical steel sheet ES (workpiece plate), which is a strip-like metal plate. The apparatus 100 includes an uncoiler 110, a feeding device 120 (feeder), a blanking device 130, and a controller 140 (control unit).

The uncoiler 110 rotatably holds a coil material 111 with the coil material 111 attached thereto. The coil material 111 is a strip-like electrical steel sheet ES wound into a coil shape. The feeding device 120 has a pair of rollers 121 and 122 sandwiching the electrical steel sheet ES from above, and below. A pair of rollers 121 and 122 rotate and stop based on an instruction signal from the controller 140 and sequentially feed the electrical steel sheet ES intermittently toward the blanking device 130.

The length of the electrical steel sheet ES that forms the coil material 111 may be, for example, approximately 500 m to 10000 m. The thickness of the electrical steel sheet ES may be, for example, approximately 0.1 mm to 0.5 mm. The thickness of the electrical steel sheet ES may be, for example, approximately 0.1 mm to 0.3 mm in terms of obtaining the stacked stator core 1 and the stacked rotor core 2 having more excellent magnetic characteristics. The width of the electrical steel sheet ES may be, for example, approximately 50 mm to 500 mm.

The blanking device 130 operates based on an instruction signal from the controller 140. The blanking device 130 has a function of sequentially blanking an electrical steel sheet W intermittently fed by the feeding device 120 to form the blanked members W1 and W2, a function of sequentially stacking the blanked members W1 obtained by blanking to produce the stacked stator core 1, and a function of sequentially stacking the blanked members W2 to produce the stacked rotor core 2.

The controller 140, for example, generates an instruction signal for operating each of the feeding device 120 and the blanking device 130, based on a program stored in a recording medium or an operation input from an operator, and transmits the instruction signal to the feeding device 120 and the blanking device 130.

Blanking Device

Figure 13:
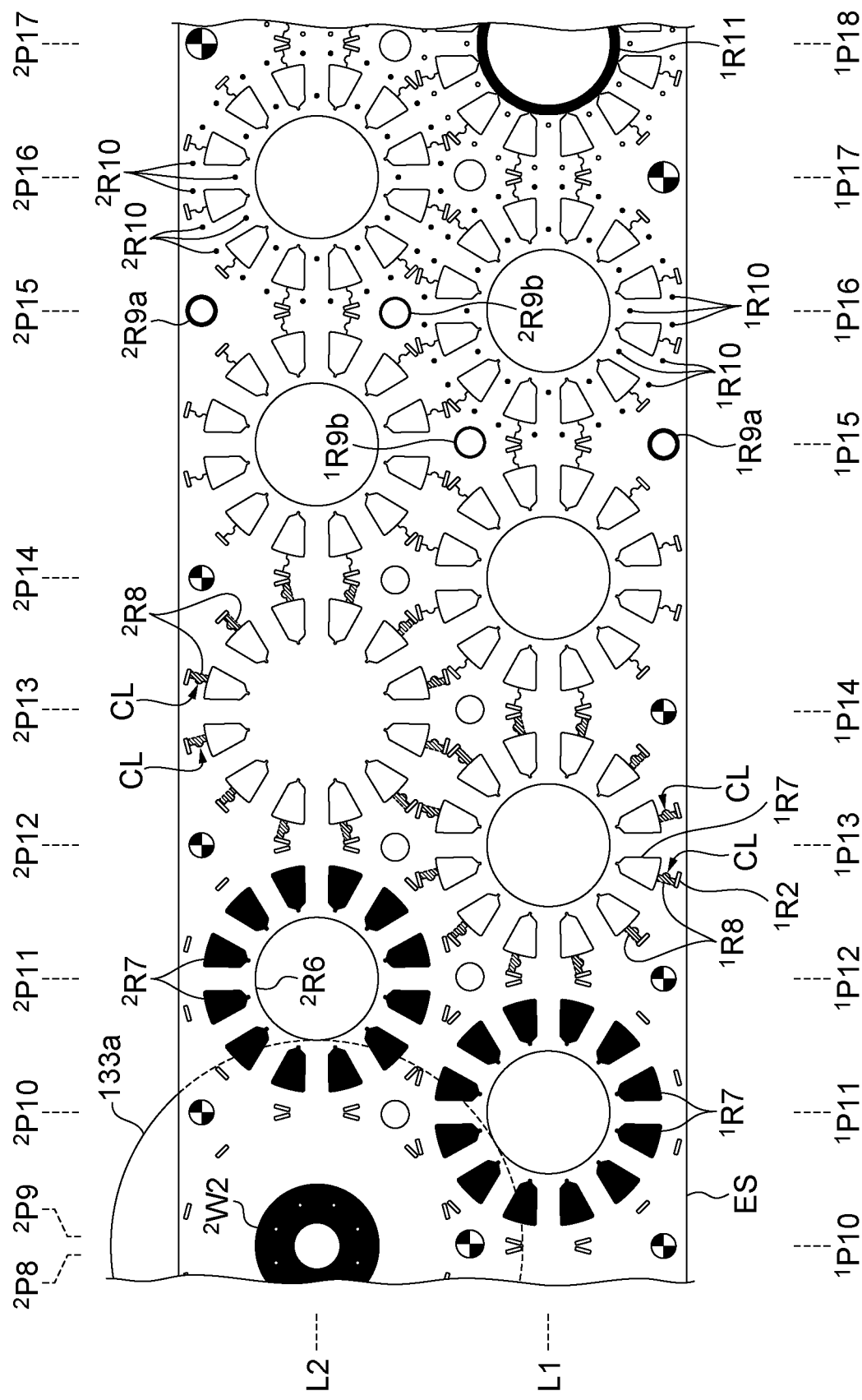
FIG. 13 is a diagram illustrating an example part manufactured following the example layout of stamping in FIG. 12.
Figure 14:
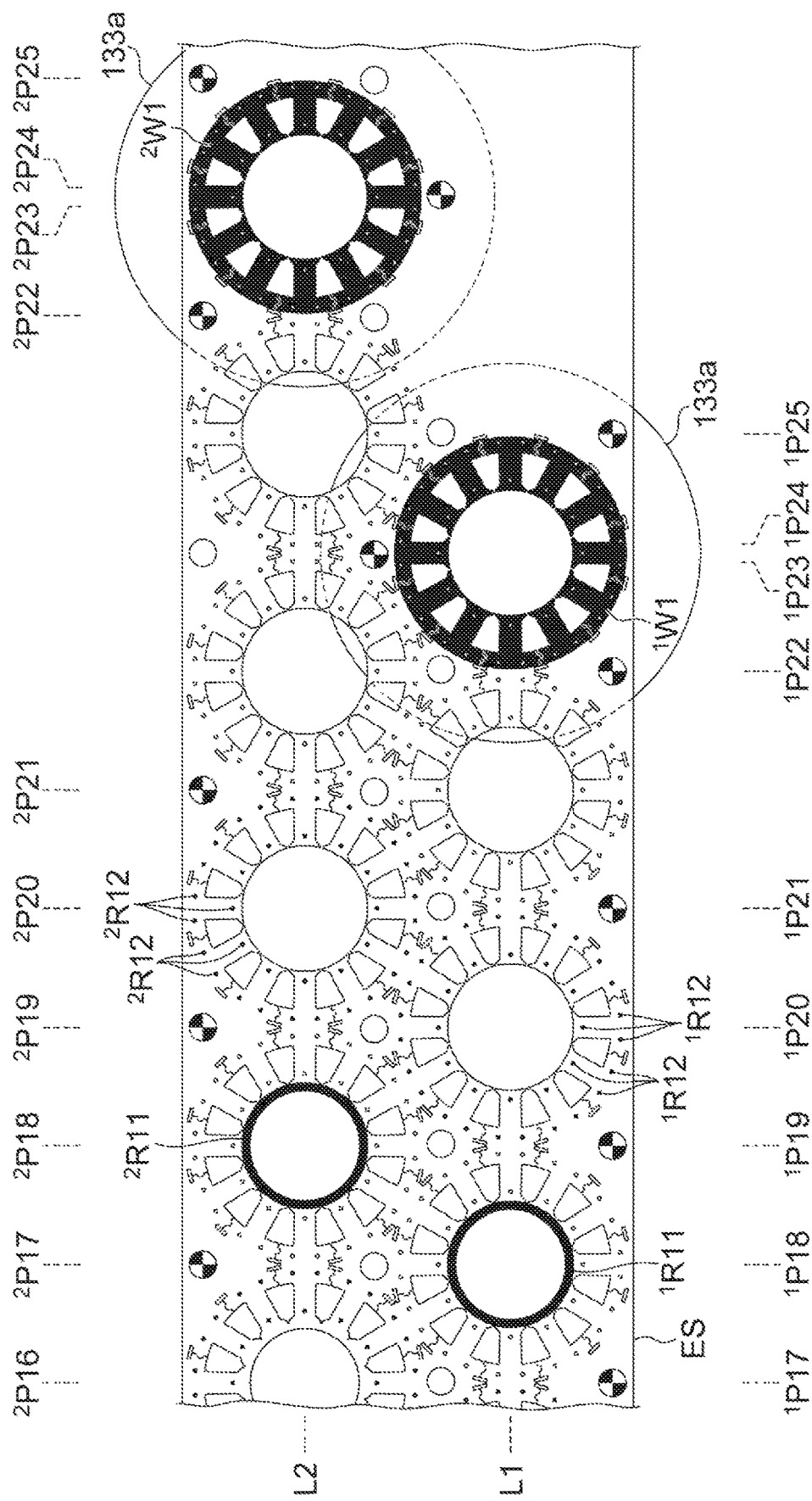
FIG. 14 is a diagram illustrating an example part manufactured following the example layout of stamping in FIG. 13.

Referring now to FIG. 5 to FIG. 9, the blanking device 130 is described in more detail. In some examples, the blanking device 130 may form the blanked members W1 and W2 in different lines in the width direction of the electrical steel sheet ES. For example, the blanking device 130 fowls blanked members $^1$W1 and $^1$W2 in the first line L1 (see FIG. 12 to FIG. 14) and forms blanked members $^2$W1 and $^2$W2 in the second line L2 (see FIG. 12 to FIG. 14). A numerical superscript "1" to the left of a reference sign indicates that the element denoted by the reference sign relates to the first line L1, and a numerical superscript "2" to the left of a reference sign indicates that the element denoted by the reference sign relates to the second line L2.

Figure 6:
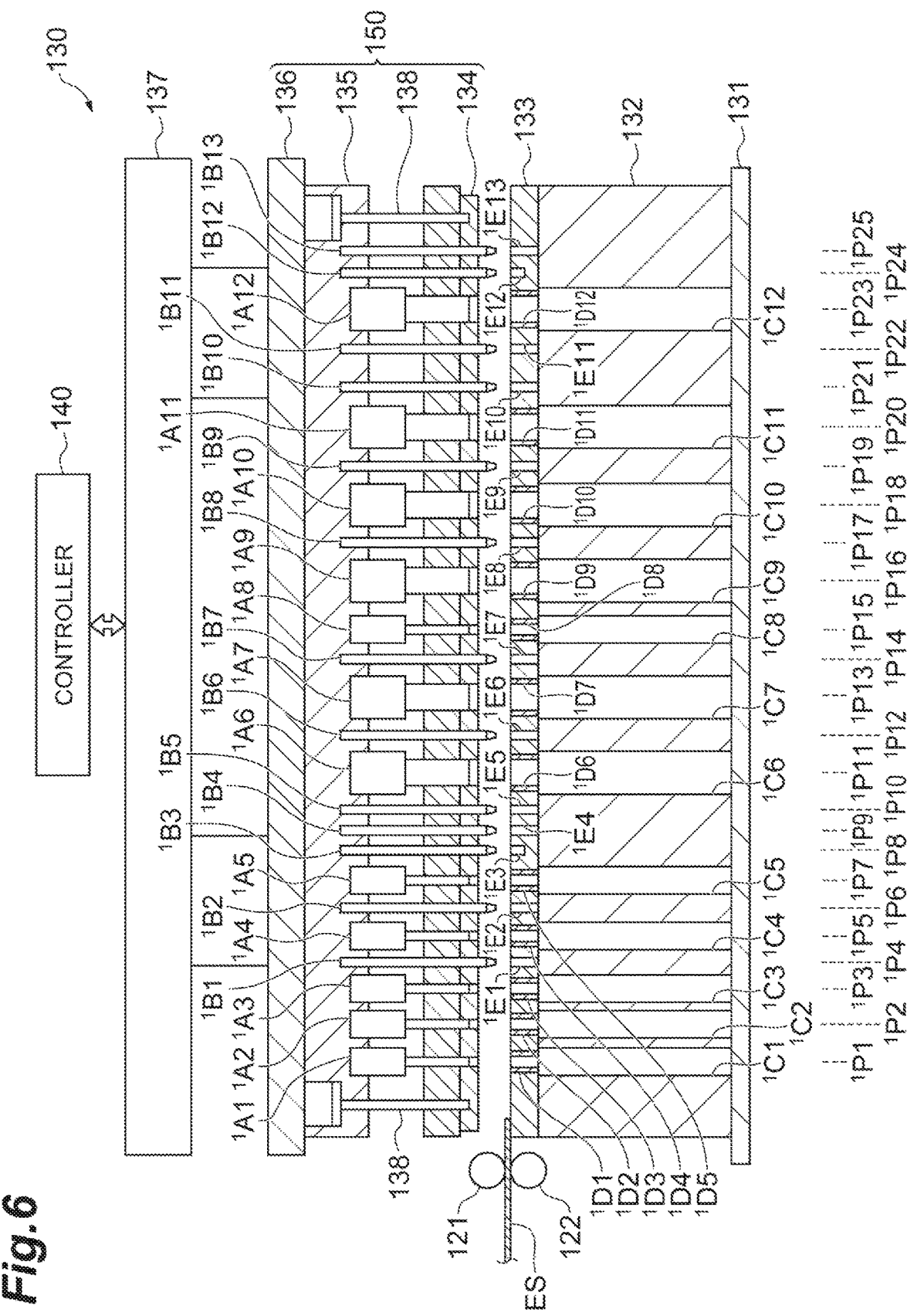
FIG. 6 is a first schematic sectional view illustrating an example blanking device taken along a first line.
Figure 7:
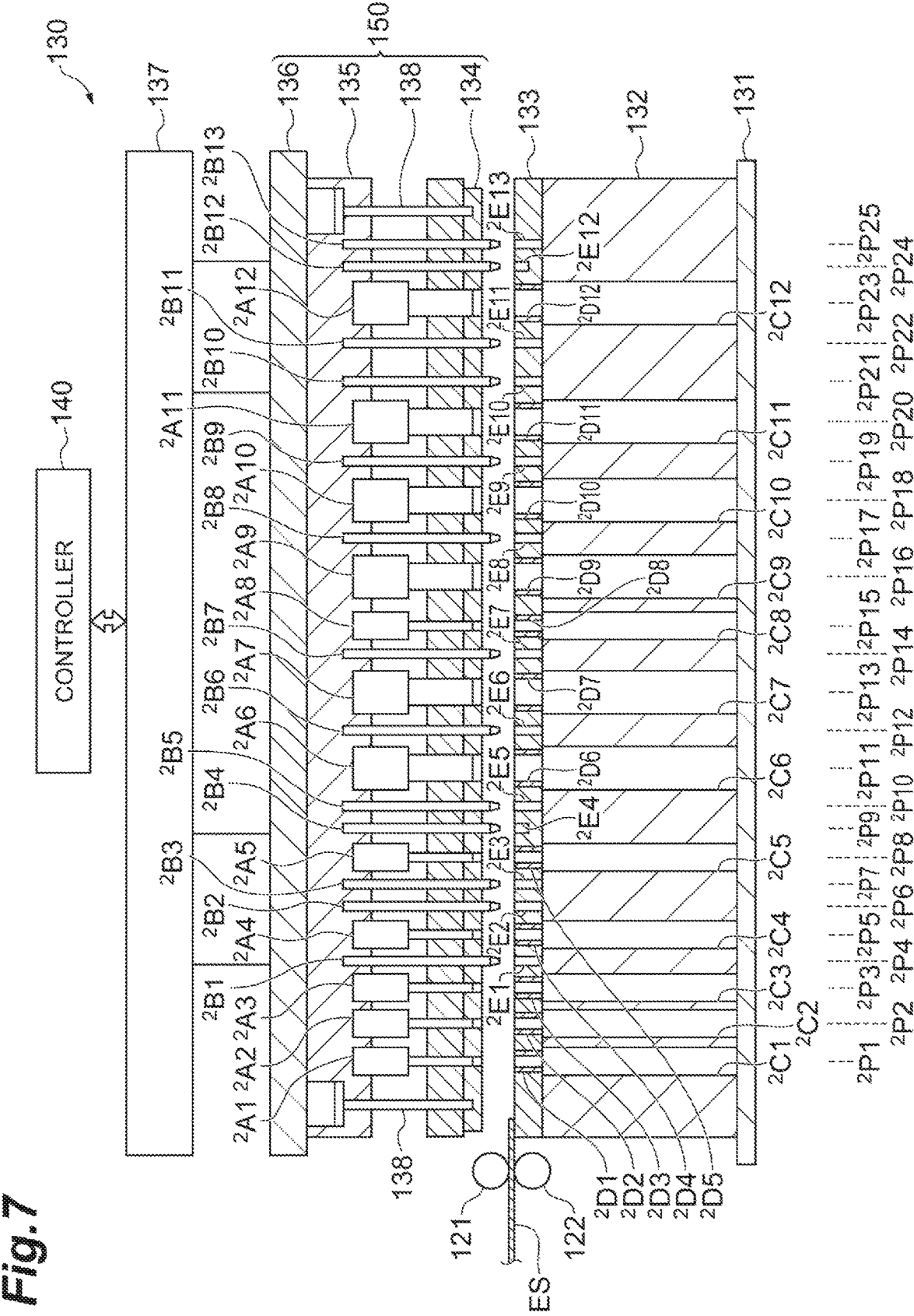
FIG. 7 is a second schematic sectional view illustrating the blanking device taken along a second line.

As illustrated in FIG. 5 to FIG. 7, the blanking device 130 has a base 131, a lower die 132, a die plate 133, a stripper 134, an upper die 135, a top plate 136, a press machine 137 (driver), a suspender 138, punches $^1$A1 to $^1$A12 and $^2$A1 to $^2$A12, and pilot pins $^1$B1 to $^1$B13 and $^2$B1 to $^2$B13. The base 131 is installed on a floor surface and supports the lower die 132 placed on the base 131.

The lower die 132 holds the die plate 133 placed on the lower die 132. The lower die 132 has ejection holes $^1$C1 to $^1$C12 and $^2$C1 to $^2$C12 to which the material blanked from the electrical steel sheet ES (for example, blanked members W1 and W2, waste material) are ejected, at the positions corresponding to the punches $^1$A1 to $^1$A12 and $^2$A1 to $^2$A12, respectively.

The die plate 133 has a function of forming the blanked members W1 and W2 together with the punches $^1$A1 to $^1$A12 and $^2$A1 to $^2$A12. The die plate 133 is provided with dies $^1$D1 to $^1$D12 and $^2$D1 to $^2$D12 at the positions corresponding to the punches $^1$A1 to $^1$A12 and $^2$A1 to $^2$A12, respectively. In each of the dies $^1$D1 to $^1$D12 and $^2$D1 to $^2$D12, a die hole (through hole) is provided, which extends in the top-bottom direction and is communicatively connected with the corresponding one of the ejection holes $^1$C1 to $^1$C12 and $^2$C1 to $^2$C12. The size of each through hole is set to such a degree that allows insertion of the tip end of the corresponding one of the punches $^1$A1 to $^1$A12 and $^2$A1 to $^2$A12 and is slightly smaller than the tip end.

Figure 8:
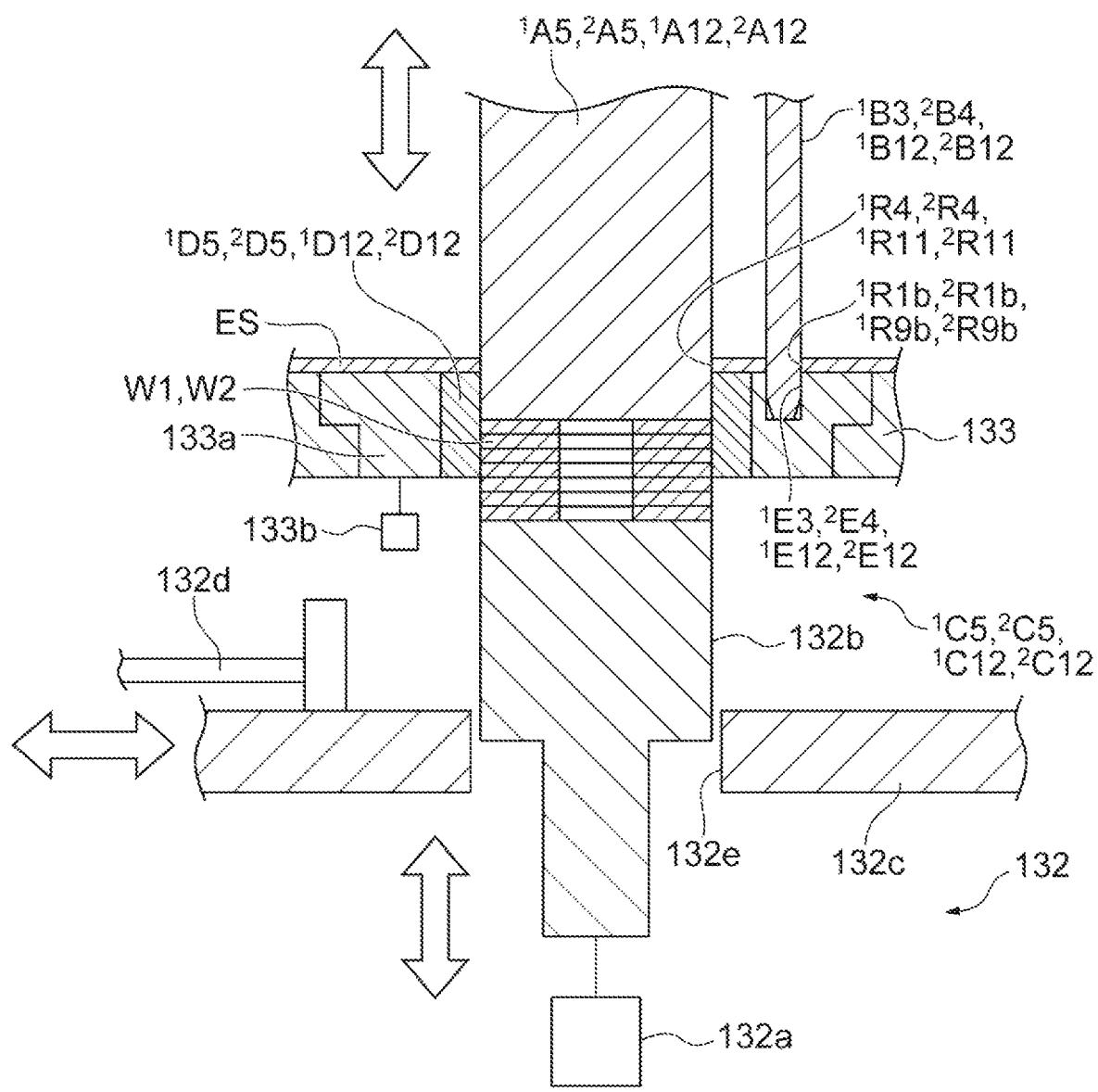
FIG. 8 is a sectional view schematically illustrating an example mechanism for stacking a blanked member and an example mechanism for ejecting a stack from a die.
Figure 9:
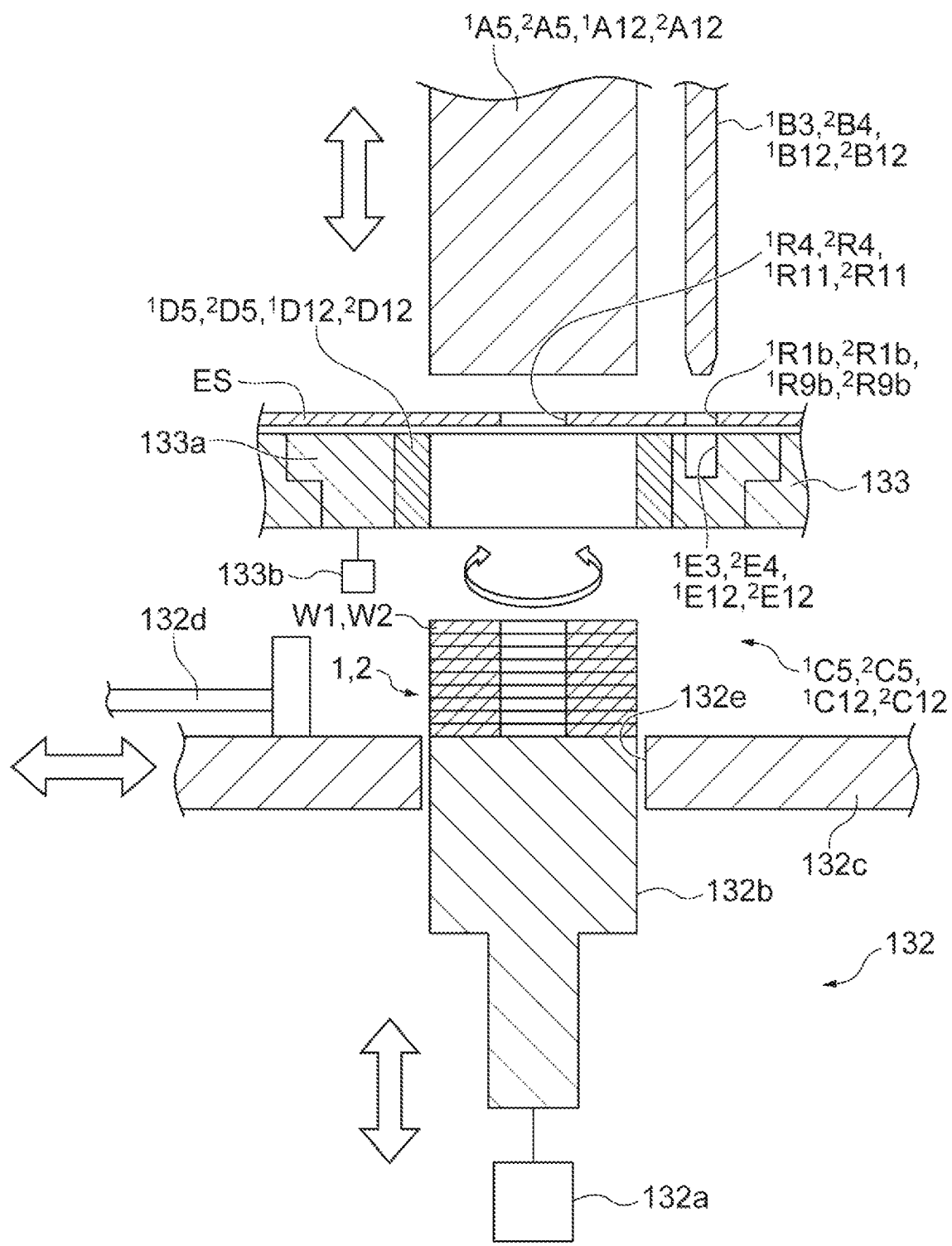
FIG. 9 is a sectional view schematically illustrating another example mechanism for stacking a blanked member and another example mechanism for ejecting a stack from a die.

As illustrated in FIG. 8 and FIG. 9, the dies $^1$D5, $^1$D12, $^2$D5, $^2$D12 are held on the inner wall surface of corresponding die holders 133a, each of the die holders 133a having a cylindrical shape. Each of the die holders 133a is attached to the die plate 133 so as to be rotatable around the center axis extending in the vertical direction. Drive mechanisms 133b are connected to the corresponding die holders 133a. The drive mechanisms 133b rotate the corresponding die holders 133a around the center axis of the die holder 133a, based on an instruction signal from the controller 140. Thus, after the cut-out blanked member W1, W2 is stacked on a cylinder 132b, the die holder 133a rotates by a predetermined angle, whereby the following blanked member W1, W2 is rotationally stacked on the preceding blanked member W1, W2. The drive mechanisms 133b may be configured with, for example, a combination of a rotary motor and a gear.

As illustrated in FIG. 6 and FIG. 7, the die plate 133 is provided with pilot holes $^1$E1 to $^1$E13 and $^2$E1 to $^2$E13 at the positions corresponding to the pilot pins $^1$B1 to $^1$B13 and $^2$B1 to $^2$B13, respectively. Among them, the pilot holes $^1$E3, $^1$E12, $^2$E4, $^2$E12 are provided in the corresponding die holders 133a, as illustrated in FIG. 8 and FIG. 9. For example, in the die holder 133a holding the die $^1$D5, a plurality of pilot holes $^1$E3 are provided on the upper surface of the die holder 133a so as to be aligned along the outer peripheral edge of the die holder 133a. This is applicable to the pilot holes $^1$E12, $^2$E4, and $^2$E12. The number and the positions of the pilot holes $^1$E3, $^1$E12, $^2$E4, and $^2$E12 may be set as appropriate in accordance with the rotational stacking angle of the blanked member W1, W2. For example, when the rotational stacking angle is 120°, three pilot holes are provided on the upper surface side of the die holder 133a, and these three pilot holes may be arranged substantially every 120° in the circumferential direction around the center axis of the die holder 133a.

The stripper 134 has a function of sandwiching the electrical steel sheet ES with the die plate 133 when the electrical steel sheet ES is blanked with the punches $^1$A1 to $^1$A12 and $^2$A1 to $^2$A12, and a function of removing the electrical steel sheet ES sticking to the punches $^1$A1 to $^1$A12 and $^2$A1 to $^2$A12 from the punches $^1$A1 to $^1$A12 and $^2$A1 to $^2$A12.

As illustrated in FIG. 6 and FIG. 7, the stripper 134 is provided with through holes extending in the top-bottom direction at the positions corresponding to the punches $^1$A1 to $^1$A12 and $^2$A1 to $^2$A12. Each through hole is communicatively connected with a die hole of the corresponding one of the dies $^1$D1 to $^1$D12 and $^2$D1 to $^2$D12 when the stripper 134 comes closer to the die plate 133. The lower portions of the punches $^1$A1 to $^1$A12 and $^2$A1 to $^2$A12 are inserted in the through holes. The lower portions of the punches $^1$A1 to $^1$A12 and $^2$A1 to $^2$A12 can slide in the through holes.

The stripper 134 is provided with through holes extending in the top-bottom direction at the positions corresponding to the pilot pins $^1$B1 to $^1$B13 and $^2$B1 to $^2$B13. Each through hole is communicatively connected with a corresponding one of the pilot holes $^1$E1 to $^1$E13 and $^2$E1 to $^2$E13 when the stripper 134 comes closer to the die plate 133. The lower portions of the pilot pins $^1$B1 to $^1$B13 and $^2$B1 to $^2$B13 are inserted in the through holes. The lower portions of the pilot pins $^1$B1 to $^1$B13 and $^2$B1 to $^2$B13 can slide in the through holes.

The upper die 135 is positioned above the stripper 134. The base portions (upper portions) of the punches $^1$A1 to $^1$A12 and $^2$A1 to $^2$A12 and the pilot pins $^1$B1 to $^1$B13 and $^2$B1 to $^2$B13 are fixed to the upper die 135. The upper die 135 thus holds the punches $^1$A1 to $^1$A12 and $^2$A1 to $^2$A12 and the pilot pins $^1$B1 to $^1$B13 and $^2$B1 to $^2$B13.

The top plate 136 is positioned above the upper die 135. The top plate 136 holds the upper die 135. The press machine 137 is positioned above the top plate 136. The piston of the press machine 137 is connected to the top plate 136 and operates based on an instruction signal from the controller 140. When the press machine 137 operates, the piston extends and retracts so that the stripper 134, the upper die 135, the top plate 136, the suspender 138, the punches $^1$A1 to $^1$A12 and $^2$A1 to $^2$A12, and the pilot pins $^1$B1 to $^1$B13 and $^2$B1 to $^2$B13 (which hereinafter are collectively referred to as a movable unit 150) move up and down as a whole.

The suspender 138 has a function of holding the stripper 134 suspended from the upper die 135. The lower end side of the suspender 138 is fixed to the stripper 134. The upper end side of the suspender 138 is attached to the upper die 135 so as to be movable up and down.

The punches $^1$A1 to $^1$A12 and $^2$A1 to $^2$A12 form punch units together with the corresponding dies $^1$D1 to $^1$D12 and $^2$D1 to $^2$D12. Each punch unit has a function of blanking the electrical steel sheet ES into a predetermined shape. The punches $^1$A1 to $^1$A12 are disposed approximately in this order from the upstream side (the feeding device 120 side) toward the downstream side of the blanking device 130. The punches $^2$A1 to $^2$A12 are disposed approximately in this order from the upstream side (the feeding device 120 side) toward the downstream side of the blanking device 130. The punches $^2$A1 to $^2$A12 are disposed so as to be roughly aligned with the punches $^1$A1 to $^1$A12, respectively, in the width direction of the electrical steel sheet ES.

The pilot pins $^1$B1, $^1$B2, $^1$B4 to $^1$B13, $^2$B1 to $^2$B3, and $^2$B5 to $^2$B13 have a function of pushing the electrical steel sheet ES against the die plate 133 when the electrical steel sheet ES is blanked by the punches $^1$A1 to $^1$A12 and $^2$A1 to $^2$A12. The pilot pins $^1$B3, $^1$B12, $^2$B4, and $^2$B12 have a function of being engaged with the corresponding pilot holes $^1$E3, $^1$E12, $^2$E4, and $^2$E12 to restrain the die holder 133a from rotating. The pilot pins $^1$B1 to $^1$B13 are disposed so as to be aligned approximately in this order from the upstream side (the feeding device 120 side) toward the downstream side of the blanking device 130. The pilot pins $^2$B1 to $^2$B13 are disposed so as to be aligned approximately in this order from the upstream side (the feeding device 120 side) toward the downstream side of the blanking device 130. The pilot pins $^2$B1 to $^2$B13 are disposed so as to be roughly aligned with the pilot pins $^1$B1 to $^1$B13, respectively, in the width direction of the electrical steel sheet ES.

As illustrated in FIG. 8, a drive mechanism 132a, a cylinder 132b, a stage 132c, and a pusher 132d are disposed in the ejection hole $^1$C5, $^2$C5, $^1$C12, $^2$C12. The drive mechanism 132a drives the cylinder 132b based on an instruction signal from the controller 140. Specifically, the drive mechanism 132a moves the cylinder 132b in the top-bottom direction. The drive mechanism 132a may be configured with, for example, a linear actuator.

The cylinder 132b has a function of elastically supporting the blanked member $^1$W2, $^2$W2, $^1$W1, $^2$W1 cut out from the electrical steel sheet ES by the punch $^1$A5, $^2$A5, $^1$A12, $^2$A12. This configuration prevents the cut-out blanked member $^1$W2, $^2$W2, $^1$W1, $^2$W1 from dropping downward.

The controller 140 can instruct the drive mechanism 132a to move the cylinder 132b in the top-bottom direction. For example, the cylinder 132b intermittently moves downward every time the blanked member W1, W2 is stacked on the cylinder 132b. Once a predetermined number of the blanked members W1, W2 are stacked on the cylinder 132b to form the stacked stator core 1 or the stacked rotor core 2, as illustrated in FIG. 9, the cylinder 132b moves to the position where the surface of the cylinder 132b is flush with the surface of the stage 132c.

When the blanked members W1, W2 are stacked on the cylinder 132b, as illustrated in FIG. 8, the tip end of the pilot pin $^1$B3, $^1$B12, $^2$B4, $^2$B12 is inserted into the pilot hole $^1$E3, $^1$E12, $^2$E4, $^2$E12. The tip end of the pilot pin $^1$B3, $^1$B12, $^2$B4, $^2$B12 is then engaged in the pilot hole $^1$E3, $^1$E12, $^2$E4, $^2$E12 to restrain the die holder 133a from rotating. In some examples, as illustrated in FIG. 9, the pilot pin $^1$B3, $^1$B12, $^2$B4, $^2$B12 is on standby above the electrical steel sheet ES. The tip end of the pilot pin $^1$B3, $^1$B12, $^2$B4, $^2$B12 is therefore not engaged in the pilot hole $^1$E3, $^1$E12, $^2$E4, $^2$E12. Accordingly, in this state, the die holder 133a is rotatable relative to the die plate 133.

The stage 132c is provided with a hole 132e through which the cylinder 132b can pass. The pusher 132d is configured to be movable in the horizontal direction on a surface of the stage 132c, based on an instruction signal from the controller 140. In a state in which the cylinder 132b moves to a position where the surface of the cylinder 132b is flush with the surface of the stage 132c, the pusher 132d pushes out the stacked stator core 1 or the stacked rotor core 2 from the cylinder 132b onto the stage 132c. The stacked stator core 1 or the stacked rotor core 2 pushed out onto the stage 132c is transported by a not-illustrated conveyor or the like to the subsequent step to produce a stator or a rotor.

Figure 10:
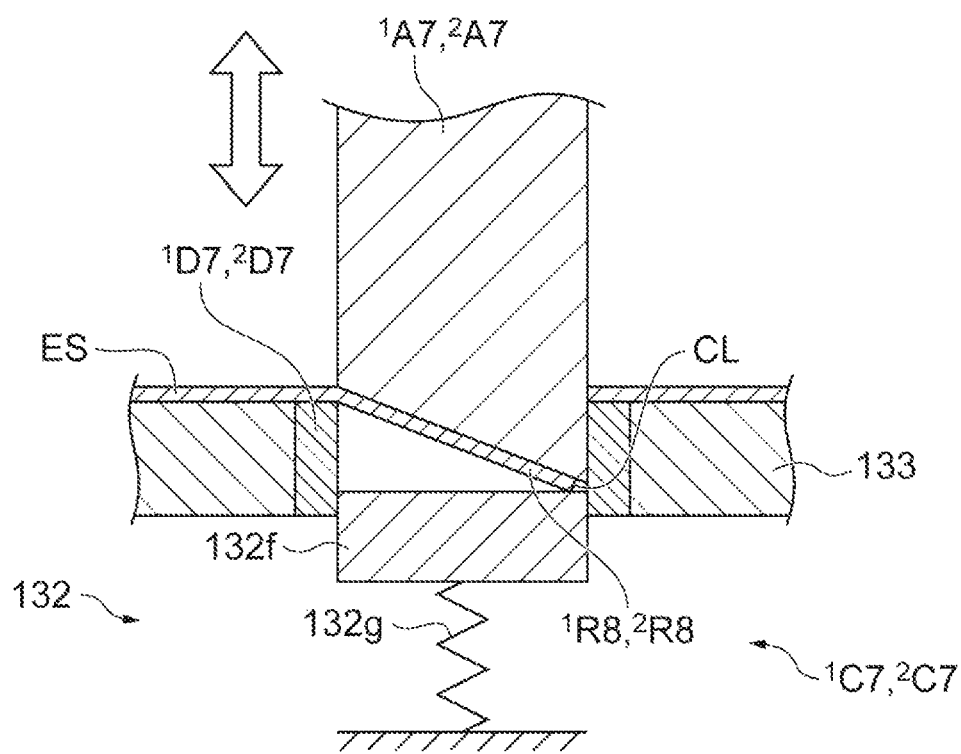
FIG. 10 is a sectional view schematically illustrating an example mechanism for press-fitting a worked portion of an electrical steel sheet.
Figure 11:
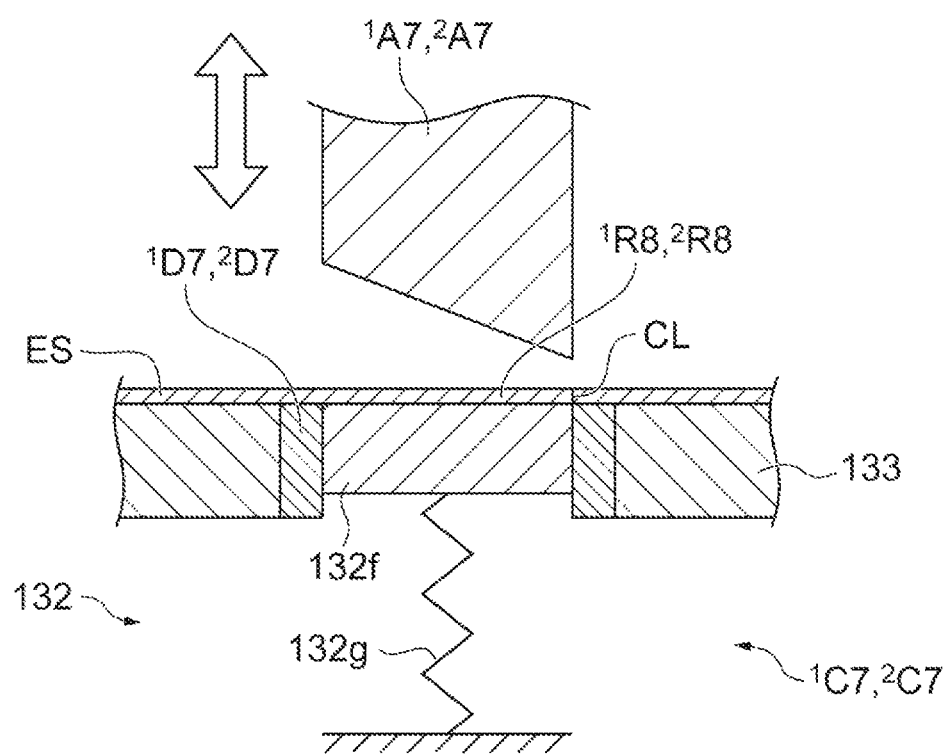
FIG. 11 is a sectional view schematically illustrating another example mechanism for press-fitting a worked portion of an electrical steel sheet.

As illustrated in FIG. 10 and FIG. 11, a backup plate 132f and a spring 132g are disposed in the ejection hole $^1$C7, $^2$C7. The backup plate 132f is configured to be urged upward (toward the punch $^1$A7, $^2$A7) by the spring 132g. As illustrated in FIG. 10, the backup plate 132f is configured to elastically support a worked area $^1$R8, $^2$R8 which is lanced or blanked from the electrical steel sheet ES by the punch $^1$A7, $^2$A7 (described in further detail below) when the punch $^1$A7, $^2$A7 is lowered the electrical steel sheet ES. As illustrated in FIG. 11, the backup plate 132f is configured to press-fit the worked area $^1$R8, $^2$R8 into the electrical steel sheet ES when the punch $^1$A7, $^2$A7 is elevated to separate from the electrical steel sheet ES.

Method of Manufacturing Stacked Core

An example method of manufacturing the stacked stator core 1 and the stacked rotor core 2 will now be described with reference to FIG. 6 and FIG. 12 to FIG. 14. The method may comprise manufacturing a pair of the stacked stator core 1 and the stacked rotor core 2 by cutting out the blanked members $^1$W1 and $^1$W2 in the first line L1 of the electrical steel sheet ES.

When the electrical steel sheet ES is fed to the blanking device 130 by the feeding device 120 and a portion to be worked in the electrical steel sheet ES reaches the punch $^1$A1, the controller 140 instructs the press machine 137 so that the press machine 137 pushes the movable unit 150 downward toward the die plate 133. Even after the stripper 134 reaches the die plate 133 and they sandwich the electrical steel sheet ES, the press machine 137 pushes the movable unit 150 downward.

Here, although the stripper 134 does not move, the tip ends of the punches $^1$A1 to $^1$A12 and the pilot pins $^1$B1 to $^1$B13 move in the through holes of the stripper 134 to reach the corresponding dies $^1$D1 to $^1$D12 and pilot holes $^1$E1 to $^1$E13 of the die plate 133. Thus, the electrical steel sheet ES is blanked by the punches $^1$A1 (first punch, seventh punch) along a predetermined blanked shape, so that a pair of through holes $^1$R1a and $^1$R1b aligned in the width direction of the electrical steel sheet ES are formed in the electrical steel sheet ES (first step/process and seventh step/process; see the position $^1$P1 in FIG. 6 and FIG. 12). The through hole $^1$R1a (first pilot hole) is positioned in the vicinity of the side edge of the electrical steel sheet ES. The through hole $^1$R1b (through hole) is positioned in the vicinity of the center of the electrical steel sheet ES. The waste material cut out is ejected from the ejection hole $^1$C1 of the lower die 132. Subsequently, the press machine 137 operates to elevate the movable unit 150.

Next, the electrical steel sheet ES is fed by the feeding device 120, and when a portion of the electrical steel sheet ES to be worked reaches the punch $^1$A2, the controller 140 instructs the press machine 137 so that the press machine 137 elevates or lowers the movable unit 150. The electrical steel sheet ES is thus blanked by the punch $^1$A2 to form a plurality of through holes $^1$R2 in the electrical steel sheet ES (see the position $^1$P2 in FIG. 6 and FIG. 12). In some examples, twelve through holes $^1$R2 each having a rectangular shape are arranged in a circular shape as a whole. The waste material cut out is ejected from the ejection hole $^1$C2 of the lower die 132.

Figure 12:
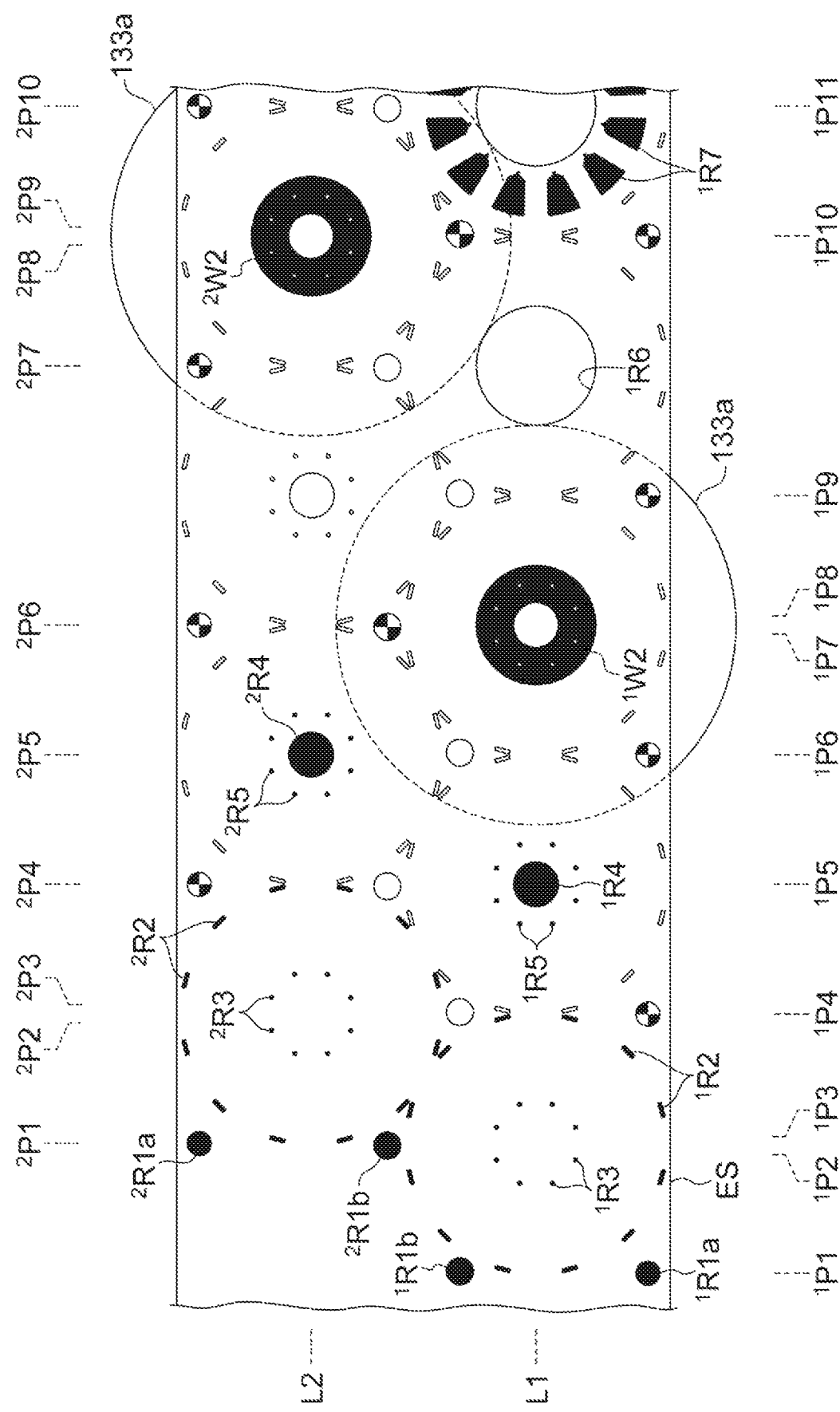
FIG. 12 is a diagram partially illustrating an example layout of stamping.

The electrical steel sheet ES may be blanked by the punch $^1$A3, at the same time, to form a plurality of through holes ¹R3 in the electrical steel sheet ES (see the position ¹P3 in FIG. 6 and FIG. 12). In some examples, eight through holes ¹R3 each having a circular shape are arranged in a circular shape as a whole inside the region surrounded by the through holes ¹R2. The waste material cut out is ejected from the ejection hole ¹C3 of the lower die 132. Each through hole ¹R3 corresponds to the through hole of the connecting tab portion 23 in the blanked member W2 of the stacked rotor core 2. When the connecting tab in the connecting tab portion 23 is formed, the blanking of the electrical steel sheet ES by the punch ¹A3 is not performed.

Next, the electrical steel sheet ES is fed by the feeding device 120, and when a portion of the electrical steel sheet ES to be worked reaches the punch ¹A4, the controller 140 instructs the press machine 137 so that the press machine 137 elevates or lowers the movable unit 150. The electrical steel sheet ES is thus blanked by the punch ¹A4 to form one through hole ¹R4 and a plurality of worked areas ¹R5 in the electrical steel sheet ES (see the position ¹P5 in FIG. 6 and FIG. 12). The through hole ¹R4 has a circular shape and corresponds to the through hole 2a in the blanked member W2 of the stacked rotor core 2. The worked area ¹R5 corresponds to the connecting tab of the connecting tab portion 23 in the blanked member W2 of the stacked rotor core 2. In some examples, eight worked areas ¹R5 are arranged in a circular shape to surround the through hole ¹R4. In blanking the electrical steel sheet ES by the punch ¹A4, the pilot pins ¹B1 and ¹B2 are inserted in the through holes ¹R1a, whereby the electrical steel sheet ES is positioned (see the positions ¹P4 and ¹P6 in FIG. 6 and FIG. 12).

When the through holes ¹R3 have already been formed at the position ¹P3 in the electrical steel sheet ES, the part of the punch ¹A4 for forming the worked areas ¹R5 passes through the through holes ¹R3 and misses the electrical steel sheet ES, so that the worked areas ¹R5 are not formed in the electrical steel sheet ES. For example, either of the through holes ¹R3 or the worked areas ¹R5 are selectively formed in the electrical steel sheet ES.

Next, the electrical steel sheet ES is fed by the feeding device 120, and when a portion of the electrical steel sheet ES to be worked reaches the punch ¹A5 (eighth punch), the controller 140 instructs the press machine 137 so that the press machine 137 elevates or lowers the movable unit 150. The electrical steel sheet ES is thus blanked by the punch ¹A5, and the blanked member ¹W2 having a plurality of connecting tab portions 23 is stacked on the cylinder 132b in the ejection hole ¹C5 (eighth step/process; see the position ¹P7 in FIG. 6 and FIG. 12). The above steps/processes are repeated whereby a plurality of blanked members ¹W2 are stacked on the cylinder 132b while being joined by the connecting tab portions 23 to form the stacked rotor core 2. In blanking the electrical steel sheet ES by the punch ¹A5, the pilot pins ¹B2 and ¹B4 (fourth pilot pin) are inserted into the through holes ¹R1a whereby the electrical steel sheet ES is positioned (see the positions ¹P6 and ¹P9 in FIG. 6 and FIG. 12). Similarly, in blanking the electrical steel sheet ES by the punch ¹A5, the pilot pin ¹B3 (fourth pilot pin) passes through the through hole ²R1b (described in further detail below), and the tip end of the pilot pin ¹B3 is inserted into the pilot hole ¹E3 to restrain the die holder 133a holding the die ¹D5 from rotating (see the position ¹P8 in FIG. 6 and FIG. 12). A through hole ¹R6 is formed in a region in the electrical steel sheet ES where the blanked member ¹W2 has been cut out.

Next, the electrical steel sheet ES is fed by the feeding device 120, and when a portion of the electrical steel sheet ES to be worked reaches the punch ¹A6 (fifth punch), the controller 140 instructs the press machine 137 so that the press machine 137 elevates or lowers the movable unit 150. The electrical steel sheet ES is thus blanked by the punch ¹A6 to form a plurality of through holes ¹R7 (slot-corresponding holes) in the electrical steel sheet ES (fifth step/process; see the position ¹P11 in FIG. 6, FIG. 12, and FIG. 13). In some examples, twelve through holes ¹R7 each having an approximate sector shape are arranged in a circular shape as a whole. The through hole ¹R7 corresponds to the slot W14 in the blanked member W1 of the stacked stator core 1. The waste material cut out is ejected from the ejection hole ¹C6 of the lower die 132. In blanking the electrical steel sheet ES by the punch ¹A6, the pilot pins ¹B5 and ¹B6 are inserted into the through holes ¹R1a whereby the electrical steel sheet ES is positioned (see the positions ¹P10 and ¹P12 in FIG. 6, FIG. 12, and FIG. 13).

Next, the electrical steel sheet ES is fed by the feeding device 120, and when a portion of the electrical steel sheet ES to be worked reaches the punch ¹A7 (second punch), the controller 140 instructs the press machine 137 so that the press machine 137 elevates or lowers the movable unit 150. A worked area ¹R8 (worked portion) is thus formed between the through holes ¹R2 and ¹R7 of the electrical steel sheet ES (second step/process; see the position ¹P13 in FIG. 6, FIG. 10, FIG. 11 and FIG. 13). The worked area ¹R8 is obtained by lancing or blanking the electrical steel sheet ES along the cut line CL connecting the through holes ¹R2 and ¹R7 (see FIG. 10 and FIG. 13), and thereafter press-fitting (pushing back) the worked portion into the electrical steel sheet ES (see FIG. 11). In blanking the electrical steel sheet ES by the punch ¹A7, the pilot pins ¹B6 and ¹B7 (first pilot pin) are inserted into the through holes ¹R1a whereby the electrical steel sheet ES is positioned (see the positions ¹P12 and ¹P14 in FIG. 6 and FIG. 13).

Next, the electrical steel sheet ES is fed by the feeding device 120, and when a portion of the electrical steel sheet ES to be worked reaches the punch ¹A8 (third punch), the controller 140 instructs the press machine 137 so that the press machine 137 elevates or lowers the movable unit 150. The positions coincident with the through holes ¹R1a and ¹R1b of the electrical steel sheet ES are thus blanked by the punch ¹A8, so that a plurality of through hole ¹R9a and ¹R9b (second pilot hole) are formed in the electrical steel sheet ES (third step/process; see the position ¹P15 in FIG. 6 and FIG. 13). In some examples, the through hole ¹R9a is blanked by the punch ¹A8 at the position coincident with the through hole ¹R1a and has an outer shape larger than that of the through hole ¹R1a. The through hole ¹R9b is blanked by the punch ¹A8 at the position coincident with the through hole ¹R1b and has an outer shape larger than that of the through hole ¹R1b. The waste material cut out is ejected from the ejection hole ¹C8 of the lower die 132.

Next, the electrical steel sheet ES is fed by the feeding device 120, and when a portion of the electrical steel sheet ES to be worked reaches the punch ¹A9, the controller 140 may instruct the press machine 137, so that the press machine 137 elevates or lowers the movable unit 150. The electrical steel sheet ES is thus blanked by the punch ¹A9 to form a plurality of through holes ¹R10 in the electrical steel sheet ES (see the position ¹P16 in FIG. 6 and FIG. 13). In some examples, one through hole ¹R10 is positioned between adjacent through holes ¹R7, and these through holes ¹R10 are arranged in a circular shape as a whole. Two through holes ¹R10 are positioned between adjacent worked areas ¹R8, and these through holes ¹R10 are arranged in a circular shape as a whole. The waste material cut out is ejected from the ejection hole ¹C9 of the lower die 132. Each through hole $^1$R10 corresponds to the through hole 13*b* of the connecting tab portion 13 in the blanked member W1 of the stacked stator core 1. When the connecting tab 13*a* in the connecting tab portion 13 is formed, the blanking of the electrical steel sheet ES by the punch $^1$A9 is not performed.

Next, the electrical steel sheet ES is fed by the feeding device 120, and when a portion of the electrical steel sheet ES to be worked reaches the punch $^1$A10 (sixth punch), the controller 140 instructs the press machine 137 so that the press machine 137 elevates or lowers the movable unit 150. The position coincident with the region in the electrical steel sheet ES where the blanked member $^1$W2 is cut out is blanked by the punch $^1$A10, so that one through hole $^1$R11 (center-corresponding hole) having a circular shape is formed in the electrical steel sheet ES (sixth step/process; see the position $^1$P18 in FIG. 6, FIG. 13, and FIG. 14). In some examples, the through hole $^1$R11 is blanked by the punch $^1$A10 at the position coincident with the through hole $^1$R6 and has an outer shape larger than that of the through hole $^1$R6. The through hole $^1$R11 overlaps a part of each through hole $^1$R7 on the center side of the through hole $^1$R6. The through hole $^1$R11 is thus communicatively connected with each through hole $^1$R7. The waste material cut out is ejected from the ejection hole $^1$C10 of the lower die 132. The through hole $^1$R11 corresponds to the through hole W1*a* in the blanked member W1 of the stacked stator core 1. In blanking the electrical steel sheet ES by the punch $^1$A10, the pilot pins $^1$B8 and $^1$B9 (third pilot pin) are inserted into the through holes $^1$R9*a* whereby the electrical steel sheet ES is positioned (see the positions $^1$P17 and $^1$P19 in FIG. 6 and FIG. 14).

Next, the electrical steel sheet ES is fed by the feeding device 120, and when a portion of the electrical steel sheet ES to be worked reaches the punch $^1$A11, the controller 140 instructs the press machine 137 so that the press machine 137 elevates or lowers the movable unit 150. The electrical steel sheet ES is thus processed by the punch $^1$A11 to form a plurality of worked areas $^1$R12 in the electrical steel sheet ES (see the position $^1$P20 in FIG. 6 and FIG. 14). In some examples, one worked area $^1$R12 is positioned between adjacent through holes $^1$R7, and these worked areas $^1$R12 are arranged in a circular shape as a whole. Two worked areas $^1$R12 are positioned between adjacent worked areas $^1$R8, and these worked areas $^1$R12 are arranged in a circular shape as a whole. Each worked area $^1$R12 corresponds to the connecting tab 13*a* of the connecting tab portion 13 in the blanked member W1 of the stacked stator core 1. In blanking the electrical steel sheet ES by the punch $^1$A11, the pilot pins $^1$B9 and $^1$B10 are inserted into the through holes $^1$R9*a* whereby the electrical steel sheet ES is positioned (see the positions $^1$P19 and $^1$P21 in FIG. 6 and FIG. 14).

When the through holes $^1$R10 have already been formed in the electrical steel sheet ES at the position $^1$R16, the punch $^1$A11 passes through the through holes $^1$R10 and misses the electrical steel sheet ES, so that the worked areas $^1$R12 are not formed in the electrical steel sheet ES. For example, either of the through holes $^1$R10 or the worked areas $^1$R12 are selectively formed in the electrical steel sheet ES.

Next, the electrical steel sheet ES is fed by the feeding device 120, and when a portion of the electrical steel sheet ES to be worked reaches the punch $^1$A12 (fourth punch), the controller 140 instructs the press machine 137 so that the press machine 137 elevates or lowers the movable unit 150. The region including worked areas $^1$R8 of the electrical steel sheet ES is thus blanked by the punch $^1$A12, and the blanked member $^1$W1 is stacked on the cylinder 132*b* in the ejection hole $^1$C12 (fourth step/process; see the position $^1$P23 in FIG. 6 and FIG. 14). The above steps/processes are repeated whereby a plurality of blanked members $^1$W1 are stacked on the cylinder 132*b* while being joined by the connecting tab portions 13 to form the stacked stator core 1. In blanking the electrical steel sheet ES by the punch $^1$A12, the pilot pins $^1$B11 and $^1$B13 (second pilot pin) are inserted into the through holes $^1$R9*a* whereby the electrical steel sheet ES is positioned (see the positions $^1$P22 and $^1$P25 in FIG. 6 and FIG. 14). In blanking the electrical steel sheet ES by the punch $^1$A12, as illustrated in FIG. 8, the pilot pin $^1$B12 (second pilot pin) passes through the through hole $^2$R9*b* (described in further detail below), and the tip end of the pilot pin $^1$B12 is inserted into the pilot hole $^1$E12 to restrain the die holder 133*a* holding the die $^1$D12 from rotating (see the position $^1$P24 in FIG. 6 and FIG. 14).

On the other hand, in the second line L2, through holes $^2$R1*a*, $^2$R1*b*, $^2$R2 to $^2$R4, $^2$R6, $^2$R7, $^2$R9*a*, $^2$R9*b*, $^2$R10, and $^2$R11, and worked areas $^2$R5, $^2$R8, and $^2$R12 are formed in the electrical steel sheet ES in the same manner as described above in connection with the first line L1, and the blanked members $^2$W1 and $^2$W2 are formed through the process (see FIG. 7 and FIG. 12 to FIG. 14). The stacked stator core 1 and the stacked rotor core 2 in the second line L2 may be understood to be configured similarly as in the first line L1.

In some examples, the electrical steel sheet ES is processed by the punch $^1$A7 so that the worked areas $^1$R8 are each formed between the through holes $^1$R2 and $^1$R6 in the electrical steel sheet ES. Since the electrical steel sheet ES undergoes lancing or blanking and pushing-back during the process of forming the worked areas $^1$R8, the worked areas $^1$R8 are press-fitted into the position to be worked while expanding themselves outward in the plane of the electrical steel sheet ES. Although the worked areas $^1$R8 are finely fitted in the electrical steel sheet ES to an extent that is not readily disengaged manually, strain may be generated in the electrical steel sheet ES. However, in some examples, another through hole $^1$R9*a* different from the through hole $^1$R1*a* is formed in the electrical steel sheet ES after the worked areas $^1$R8 are formed and before the electrical steel sheet ES undergoes another process. For example, the through hole $^1$R9*a* is formed in the electrical steel sheet ES deformed by strain. The position of the through hole $^1$R9*a* therefore is not displaced or the amount of displacement of the through hole $^1$R9*a* is very small. Accordingly, in a subsequent step or process, the pilot pins $^1$B8 to $^1$B11 and $^1$B13 can be inserted into the through holes $^1$R9*a* to position the electrical steel sheet ES, so that the blanked member $^1$W1 formed by blanking the electrical steel sheet ES with the punch $^1$A12 can achieve the shape as designed. As a result, the stacked stator core 1 can be formed accurately even through lancing or blanking and pushing-back of the electrical steel sheet ES.

In some examples, the through hole $^1$R9*a* is blanked by the punch $^1$A8 at the position coincident with the through hole $^1$R1*a* and has an outer shape larger than that of the through hole $^1$R1*a*. The through hole $^1$R9*a* may be formed so as to overlap the through hole $^1$R1*a* instead of separately reserving a region for forming the through hole $^1$R9*a* in the electrical steel sheet ES. A narrower electrical steel sheet ES therefore can be used, thereby improving the yield. As a result, the production cost for the stacked stator core 1 and the stacked rotor core 2 can be reduced. When the entire length of one coil material 111 fed from the uncoiler 110 is, for example, approximately several hundred meters to several tens of thousands of meters, the narrower electrical steel sheet ES very effectively achieves yield improvement and lower cost.

In some examples, after the through hole $^1$R9$a$ is formed in the electrical steel sheet ES, the through hole $^1$R11 is formed in the electrical steel sheet ES in a state in which the pilot pins $^1$B8 and $^1$B9 are inserted into the through holes $^1$R9$a$ to position the electrical steel sheet ES. The through hole 1$a$ of the stacked stator core 1 thus can be formed in a shape as desired. Accordingly, the air gap, which is a motor parameter, can be formed very accurately, thereby improving the performance of the motor.

In some examples, the blanked member $^1$W2 for the stacked rotor core 2 is blanked from the electrical steel sheet ES by the punch $^1$A5 in a state in which the pilot pin $^1$B3 is inserted into the through hole $^2$R1$b$ and the tip end of the pilot pin $^1$B3 is inserted into the pilot hole $^1$E3. When the blanked member $^1$W2 is stacked, the pilot pin $^1$B3 may be engaged in the pilot hole $^1$E3 to restrain the die holder 133$a$ holding the die $^1$D5 from rotating. Therefore, the blanked members $^1$W2 can be stacked appropriately without causing a shift in the rotational stacking angle. In addition, the pilot pin $^1$B3 is engaged in the pilot hole $^1$E3 while being inserted into the through hole $^2$R1$b$ formed in the electrical steel sheet ES instead of disposing the pilot pin $^1$B3 so as to avoid the electrical steel sheet ES, thereby effectively downsizing the apparatus 100 including the pilot pin $^1$B3 and the cylinder 132$b$.

In some examples, the blanked members $^1$W1 and $^1$W2 and the blanked members $^2$W1 and $^2$W2 are individually formed in a plurality of rows. In such multiple line arrangement work, lancing or blanking and pushing-back of the electrical steel sheet ES may cause even greater amount of strain in the electrical steel sheet ES. The position of the through hole $^1$R1$a$ may be significantly displaced accordingly. On the other hand, if the through hole $^1$R9$a$ is formed in the electrical steel sheet ES deformed by strain, and the electrical steel sheet ES undergoes the subsequent work in a state in which the pilot pins $^1$B8 to $^1$B11 and $^1$B13 are inserted into the through holes $^1$R9$a$ to position the electrical steel sheet ES, the stacked stator core 1 and the stacked rotor core 2 can be formed accurately even in the multiple line arrangement work in which the electrical steel sheet ES is more likely to be deformed.

Similar operational effects as described above can be achieved when the stacked stator core 1 and the stacked rotor core 2 are produced in the second line L2.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

For example, the through holes $^1$R1$a$ and $^1$R1$b$ may be formed in advance in the electrical steel sheet ES by other types of manufacturing apparatus.

In some examples, the through hole $^1$R9$a$ is formed in the electrical steel sheet ES such that the through hole $^1$R9$a$ overlaps the through hole $^1$R1$a$. However, the through hole $^1$R9$a$ may be formed at a position different from the through hole $^1$R1$a$.

In some examples, the stacked stator core 1 and the stacked rotor core 2 may be manufactured from one electrical steel sheet ES. However, in other examples, the stacked stator core 1 may be produced from one electrical steel sheet ES, and the stacked rotor core 2 may be produced from another electrical steel sheet ES.

In producing the stacked rotor core 2, the tip end of the pilot pin $^1$B3 may be inserted into the pilot hole $^1$E3 while the pilot pin $^1$B3 is inserted into the through hole $^2$R1$b$. However, in some examples, the pilot pin may be used to restrain the die holder 133$a$ from rotating, similarly in producing the stacked stator core 1. The pilot pin $^1$B3 may be inserted into the pilot hole $^1$E3 through the outside of the electrical steel sheet ES and the die plate 133. When rotational stacking is not performed, the die holder 133$a$ may not have the rotating function.

In some examples, an arrangement comprising two lines may be used to process the electrical steel sheet ES. However, in other examples, three or more lines may be arranged.

ADDITIONAL EXAMPLES

An example method of manufacturing a stacked core may include a first step of forming a first pilot hole in a strip-like metal plate by a first punch, and a second step, in a state in which a first pilot pin is inserted into the first pilot hole to position the metal plate, of working a predetermined portion of the metal plate by a second punch, and of press-fitting a worked portion of the metal plate that is processed by the second punch into the metal plate. Additionally, the method may comprise a third step of forming a second pilot hole in the metal plate by a third punch, after the second step and before another process is performed on the metal plate. In a fourth step, a region including the worked portion is blanked by a fourth punch to form a first blanked member, in a state in which a second pilot pin is inserted into the second pilot hole to position the metal plate, after the third step.

In some examples, the worked portion is press-fitted into the position to be worked while expanding the metal plate outward in the plane of the metal plate in the second step. Therefore, although the worked portion is firmly fitted in the metal plate to an extent that is not readily disengaged manually, strain may be generated in the metal plate. However, the second pilot hole different from the first pilot hole may be formed in the metal plate during the third step. Since the second pilot hole is formed in the metal plate deformed by strain, the position of the second pilot hole may not be displaced or the amount of displacement of the second pilot hole is very small. Accordingly, in the fourth step, the metal plate can be positioned by inserting the second pilot pin into the second pilot holes, so that the first blanked member formed by blanking the metal plate by the fourth punch can be formed in a shape as designed. As a result, the stacked core can be formed accurately during the steps of working the metal plate and of press-fitting the worked portion into the position to be worked.

In some examples, the second pilot hole having an outer shape larger than that of the first pilot hole may be formed by the third punch in the third step, at a position in the metal plate that coincides with the first pilot hole. In this case, the second pilot hole is formed so as to overlap the first pilot hole instead of separately reserving a region for forming the second pilot hole in the metal plate. Accordingly, a narrower metal plate can be used, thereby improving the yield. As a result, the production cost for the stacked core can be reduced. In some examples, when the entire length of one coil material fed from the uncoiler is approximately several hundred meters to several tens of thousands of meters, the narrower metal plate very effectively achieves yield improvement and lower cost.

An example method may further include a fifth step of blanking a region in the metal plate that corresponds to a slot of a stacked stator core by a fifth punch to form a slot-corresponding hole in the metal plate. In some examples, the fifth step may be performed after the first step and before the second step. During a sixth step, a region in the metal plate that corresponds to a center hole positioned at a center of a stacked stator core and in which a rotor is disposed, may be blanked by a sixth punch to form a center-corresponding hole in the metal plate, in a state in which a third pilot pin is inserted into the second pilot hole to position the metal plate. In some examples, the sixth step may be performed after the third step and before the fourth step. A motor is formed by disposing a rotor in the center hole of a stacked stator core. The gap (or air gap) between the inner peripheral surface of the center hole of the stacked stator core and the outer peripheral surface of the rotor is a motor parameter. The center-corresponding hole corresponding to the center hole of the stacked stator core is formed in the metal plate in a state in which the third pilot pin is inserted into the second pilot hole to position the metal plate. The center hole of the stacked stator core thus can be formed in a shape as designed. Accordingly, the air gap can be formed very accurately, thereby improving the performance of the motor.

An example method may further include a seventh step of forming a through hole in the metal plate by a seventh punch. In some examples, the seventh step may be performed before the second step. During an eighth step, a second blanked member for a stacked rotor core may be blanked from the metal plate by an eighth punch through a die held by a rotatable die holder, and the second blanked member may be stacked on another second blanked member that has already been blanked from the metal plate. In some examples, the eighth step may be performed after the seventh step and before the second step. In the eighth step, when the second blanked member is stacked on the another second blanked member, a fourth pilot pin inserted into the through hole may be engaged in an engagement hole in the rotatable die holder to restrain the rotatable die holder from rotating. The rotatable die holder is configured to be rotatable for the purpose of rotationally stacking the second blanked members. However, if the rotatable die holder rotates when the second blanked members are stacked, the rotational stacking angle may be shifted to cause a failure in appropriate rotational stacking. Then, when the second blanked members are stacked, the fourth pilot pin is engaged in the engagement hole of the rotatable die holder to restrain the rotatable die holder from rotating. This process prevents a shift in rotational stacking angle and therefore, the second blanked members can be stacked appropriately. In addition, the fourth pilot pin is engaged in the engagement hole of the rotatable die holder while being inserted into the through hole formed in the metal plate instead of disposing the fourth pilot pin so as to avoid the metal plate, thereby downsizing the apparatus including the fourth pilot pin and the rotatable die holder.

In some examples, the first blanked member may be formed in each of multiple lines shifted in pitch in a width direction of the metal plate. In such multiple line arrangement work, the steps of processing the metal plate and of press-fitting the worked portion into the position to be worked may cause an even greater strain in the metal plate. The position of the first pilot hole thus may be significantly displaced. However, the second pilot hole may also be formed in the metal plate deformed by strain, and the subsequent work on the metal plate is performed in a state in which the second pilot pin is inserted into the second pilot hole. Therefore, even in the multiple line arrangement work in which the metal plate is more likely to be deformed, the stacked core can be formed accurately.

Another example apparatus for manufacturing a stacked core includes a feeder configured to sequentially feed a strip-like metal plate intermittently, first to fourth punches, first and second pilot pins, a drive unit configured to drive the first to fourth punches and the first and second pilot pins, and a control unit. While controlling the feeder and the drive unit to sequentially feed the metal plate intermittently, the control unit may be configured to perform a first process of forming a first pilot hole in the metal plate by the first punch, and a second process of working a predetermined portion of the metal plate by the second punch, and of press-fitting a worked portion of the metal plate that is processed by the second punch into the metal plate. In some examples, the second process may be performed in a state in which the first pilot pin is inserted into the first pilot hole to position the metal plate. Additionally, the example method may comprise a third process of forming a second pilot hole in the metal plate by the third punch, after the second process and before another work is performed on the metal plate, and a fourth process of blanking a region including the worked portion by the fourth punch to form a first blanked member. In some examples, the fourth process may be performed in a state in which the second pilot pin is inserted into the second pilot hole to position the metal plate, after the third process.

In the third process, the control unit may cause the third punch to form the second pilot hole having an outer shape larger than that of the first pilot hole at a position in the metal plate that coincides with the first pilot hole.

The apparatus may further include a third pilot pin, and fifth and sixth punches. The control unit may control the drive unit to further perform a fifth process of blanking a region in the metal plate that corresponds to a slot of a stacked stator core by the fifth punch to than a slot-corresponding hole in the metal plate, after the first process and before the second process. During a sixth process, a region in the metal plate that corresponds to a center hole positioned at a center of a stacked stator core and in which a rotor is disposed, may be blanked by the sixth punch to form a center-corresponding hole in the metal plate. In some examples, the sixth process may be performed in a state in which the third pilot pin is inserted into the second pilot hole to position the metal plate, after the third process and before the fourth process.

The apparatus may further include seventh and eighth punches, a fourth pilot pin, and a rotatable die holder having an engagement hole configured to be engaged with the fourth pilot pin. The control unit may control the drive unit to further perform a seventh process of forming a through hole in the metal plate by the seventh punch before the second process. During an eighth process, a second blanked member for a stacked rotor core from the metal plate may be blanked by the eighth punch through a die held by the rotatable die holder, and the second blanked member may be stacked on another second blanked member already blanked from the metal plate. In some examples, the eight process may be performed in a state in which the fourth pilot pin is inserted into the through hole and engaged in the engagement hole to restrain the die holder from rotating, after the seventh process and before the second process.

Additionally, in some examples, the first blanked member may be formed in each of multiple lines shifted in pitch in a width direction of the metal plate.

We claim all modifications and variations coming within the spirit and scope of the subject matter claimed herein.

The invention claimed is:

1. A method of manufacturing a stacked core, the method comprising:

forming a first pilot hole in a metal plate by a first punch;
inserting a first pilot pin into the first pilot hole in order to align the metal plate with a second punch;
forming a worked portion of the metal plate by the second punch, after inserting the first pilot pin into the first pilot hole, wherein the worked portion is moved downwardly away from a plane of the metal plate while the first pilot pin is at least partially located in the first pilot hole;
press-fitting the worked portion of the metal plate by pressing the worked portion upwardly toward the plane of the metal plate, thereby generating a displacement of the first pilot hole along the plane of the metal plate after the first pilot pin is inserted into the first pilot hole;
forming a second pilot hole in the metal plate by a third punch, after press-fitting the worked portion of the metal plate;
inserting a second pilot pin into the second pilot hole in order to align the metal plate with a fourth punch; and
forming a blanked member by blanking the metal plate by the fourth punch, after inserting the second pilot pin into the second pilot hole, wherein the blanked member includes the worked portion, and wherein the blanked member is formed while the second pilot pin is at least partially located in the second pilot hole.

2. The method according to claim 1, wherein the second pilot hole formed by the third punch is located at a position in the metal plate that coincides with the first pilot hole, wherein a diameter of the second pilot hole is larger than a diameter of the first pilot hole.

3. The method according to claim 1, further comprising:
forming a slot-corresponding hole in the metal plate by blanking a second region of the metal plate by a fifth punch, the second region corresponding to a slot of a stacked stator core, after forming the first pilot hole and before forming the worked portion by the second punch;
inserting a third pilot pin into the second pilot hole, before the second pilot pin is inserted into the second pilot hole;
forming a center-corresponding hole in the metal plate by blanking a third region in the metal plate by a sixth punch, the third region corresponding to a center hole positioned at a center of the stacked stator core and in which a rotor is disposed, while the third pilot pin is at least partially located in the second pilot hole, after forming the second pilot hole and before forming the blanked member; and
removing the third pilot pin from the second pilot hole.

4. The method according to claim 3, further comprising:
forming a through hole in the metal plate by a seventh punch, before forming the worked portion by the second punch;
blanking a blanked rotor member for a stacked rotor core from the metal plate by an eighth punch through a die held by a rotatable die holder, after forming the through hole and before forming the worked portion by the second punch, wherein the rotatable die holder is adapted to rotate the blanked rotor member relative to the metal plate;
inserting a fourth pilot pin into the through hole; and
stacking the blanked rotor member on another blanked rotor member previously blanked from the metal plate, while the fourth pilot pin is at least partially located in the through hole and is at least partially located in an engagement hole in the rotatable die holder to restrain the rotatable die holder from rotating relative to the metal plate.

5. The method according to claim 1, wherein the blanked member is formed in each of multiple lines shifted in pitch in a width direction of the metal plate.

6. An apparatus for manufacturing the stacked core according to the method of claim 1, the apparatus comprising:
a feeder configured to feed the metal plate;
the first to fourth punches;
the first and second pilot pins;
a driver comprising a driving mechanism configured to drive the first to fourth punches and the first and second pilot pins based on instruction signals from a controller; and
the controller communicably connected to the feeder and the driver, wherein the controller is configured to:
control the feeder to sequentially feed the metal plate,
control the driver to form the first pilot hole in the metal plate by the first punch,
control the driver to insert the first pilot pin into the first pilot hole,
control the driver to form the worked portion of the metal plate by the second punch, while the first pilot pin is at least partially located in the first pilot hole,
control the driver to form the second pilot hole in the metal plate by the third punch, after the worked portion of the metal plate is press-fitted into the metal plate,
control the driver to insert the second pilot pin into the second pilot hole, and
control the driver to form the blanked member by blanking the metal plate by the fourth punch, while the second pilot pin is at least partially located in the second pilot hole.

7. The apparatus according to claim 6, wherein the second pilot hole is formed by the third punch at a position in the metal plate that coincides with the first pilot hole, wherein the second pilot hole has a diameter that is greater than a diameter of the first pilot hole, and wherein the third punch is located downstream the first pilot pin in a feeding direction of the feeder.

8. The apparatus according to claim 6, further comprising:
a third pilot pin; and
fifth and sixth punches,
wherein the controller is further configured to:
control the driver to form a slot-corresponding hole in the metal plate by blanking a second region in the metal plate that corresponds to a slot of a stacked stator core by the fifth punch, after forming the first pilot hole and before forming the worked portion by the second punch,
control the driver to insert the third pilot pin into the second pilot hole, before the second pilot pin is inserted into the second pilot hole,
control the driver to form a center-corresponding hole in the metal plate by blanking a third region in the metal plate by the sixth punch, the third region corresponding to a center hole positioned at a center of the stacked stator core and in which a rotor is disposed, while the third pilot pin is at least partially located in the second pilot hole, after forming the second pilot hole and before forming the blanked member; and
control the driver to remove the third pilot pin from the second pilot hole.

9. The apparatus according to claim 8, further comprising seventh and eighth punches;
a fourth pilot pin; and
a rotatable die holder having an engagement hole configured to be engaged with the fourth pilot pin,
wherein the controller is further configured to:
control the driver to form a through hole in the metal plate by the seventh punch before working the predetermined portion by the second punch,
control the driver to insert the fourth pilot pin into the through hole, and
control the driver to blank a blanked rotor member for a stacked rotor core from the metal plate by the eighth punch through a die held by the rotatable die holder so that the blanked rotor member is stacked on another blanked rotor member already blanked from the metal plate, while the fourth pilot pin is at least partially located in the through hole and is at least partially located in the engagement hole to restrain the rotatable die holder from rotating, after forming the through hole and before forming the worked portion by the second punch.

10. The apparatus according to claim 6, wherein the blanked member is formed in each of multiple lines shifted in pitch in a width direction of the metal plate.

11. The method according to claim 1,
wherein the worked portion is formed to be at least partially separated from a main portion of the metal plate, wherein the main portion extends along the plane of the metal plate, and
wherein press-fitting the worked portion includes pressing the worked portion into the main portion of the metal plate, so as to flatten the worked portion to substantially extend along the plane of the metal plate.

12. The method according to claim 1, wherein the second pilot hole is formed such that the metal plate includes both the second pilot hole and the first pilot hole that has been displaced.

13. The method according to claim 1, further comprising:
moving the metal plate in a feeding direction, wherein the second punch is positioned downstream of the first punch, the third punch is positioned downstream of the second punch and the fourth punch is positioned downstream of the third punch, in the feeding direction,
wherein the first pilot pin at least partially located in the first pilot hole restricts a movement of the metal plate in the feeding direction of the metal plate when forming the worked portion, and
wherein the second pilot pin at least partially located in the second pilot hole restricts the movement of the metal plate in the feeding direction when forming the blanked member.

14. A method of manufacturing a stacked core, the method comprising:
forming a first pilot hole in a metal plate;
inserting a first pilot pin into the first pilot hole;
while the first pilot pin is at least partially located in the first pilot hole, forming a worked portion in the metal plate by at least partially separating the worked portion from a main portion of the metal plate, wherein the worked portion is moved in a perpendicular direction relative to a plane of the metal plate;
press-fitting the worked portion into the main portion of the metal plate, in the perpendicular direction, to substantially flatten the worked portion in substantial alignment with the plane of the metal plate, thereby displacing the first pilot hole along the plane of the metal plate after the first pilot pin is inserted into the first pilot hole;
forming a second pilot hole in the metal plate that includes the first pilot hole that has been displaced, after press-fitting the worked portion of the metal plate;
inserting a second pilot pin into the second pilot hole; and
while the second pilot pin is at least partially located in the second pilot hole, blanking the metal plate around the worked portion to form a blanked member that includes the worked portion that has been substantially flattened.

15. The method according to claim 14, wherein the worked portion is formed by lancing the metal plate by partially separating the worked portion from the main portion of the metal plate so as to incline the worked portion relative to the plane of the metal plate.

16. The method according to claim 14, wherein the worked portion is formed by blanking the metal plate so as to offset the worked portion from the plane of the metal plate.

17. The method according to claim 14, wherein the second pilot hole is formed at a position in the metal plate that coincides with the first pilot hole, and wherein a diameter of the second pilot hole is larger than a diameter of the first pilot hole.

18. The method according to claim 14, further comprising:
after forming the first pilot hole and before forming the worked portion, forming a slot-corresponding hole in the metal plate by blanking a region of the metal plate that corresponds to a slot of a stacked stator core;
inserting a third pilot pin into the second pilot hole, before the second pilot pin is inserted into the second pilot hole;
after forming the second pilot hole and before forming the blanked member, forming a center-corresponding hole in the metal plate by blanking a region in the metal plate that corresponds to a center hole of the stacked stator core to receive a rotor, while the third pilot pin is at least partially located in the second pilot hole; and
removing the third pilot pin from the second pilot hole.

19. The method according to claim 18, further comprising:
forming a through hole in the metal plate before forming the worked portion;
after forming the through hole and before forming the worked portion, blanking a blanked rotor member from the metal plate, through a die, the blanked rotor member to be stacked in a stacked rotor core, wherein the die is held by a rotatable die holder that is adapted to rotate the blanked rotor member relative to the metal plate;
inserting a fourth pilot pin into the through hole; and
stacking the blanked rotor member on another blanked rotor member having been-previously blanked from the metal plate, while the fourth pilot pin is at least partially located in the through hole and additionally at least partially located in an engagement hole of the rotatable die holder to rotationally fix the rotatable die holder relative to the metal plate.

20. The method according to claim 14, wherein the blanked member is formed in each of multiple lines shifted in pitch in a width direction of the metal plate.

* * * * *